US012380867B2

(12) United States Patent
Guo et al.

(10) Patent No.: US 12,380,867 B2
(45) Date of Patent: Aug. 5, 2025

(54) ELECTRONIC DEVICE

(71) Applicant: InnoLux Corporation, Miao-Li County (TW)

(72) Inventors: Ming-Chi Guo, Miao-Li County (TW); Hsing-Yuan Hsu, Miao-Li County (TW); Po-Yang Chen, Miao-Li County (TW); I-An Yao, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/443,573

(22) Filed: Feb. 16, 2024

(65) Prior Publication Data

US 2024/0312427 A1 Sep. 19, 2024

(30) Foreign Application Priority Data

Mar. 17, 2023 (CN) ........................ 202310258740.4

(51) Int. Cl.
*G09G 3/36* (2006.01)

(52) U.S. Cl.
CPC ......... *G09G 3/3677* (2013.01); *G09G 3/3688* (2013.01); *G09G 2310/0278* (2013.01)

(58) Field of Classification Search
CPC ............................................. G09G 2310/0278
See application file for complete search history.

(56) References Cited

U.S. PATENT DOCUMENTS 11,947,204 B2 * 4/2024 Yang .................... G09G 3/3629
2008/0266278 A1 * 10/2008 Lee ..................... G02F 1/13338 345/204
2009/0033811 A1 * 2/2009 Schneider ............. G06F 3/0412 349/12
2011/0221730 A1 * 9/2011 Nishizawa ............ G06F 3/0488 345/211
2014/0340589 A1 * 11/2014 Montbach ........... G02F 1/13336 349/12
2016/0091745 A1 * 3/2016 Braganza ............ G02F 1/13338 349/12
2018/0143475 A1 * 5/2018 Li ........................... G06F 3/017
(Continued)

FOREIGN PATENT DOCUMENTS

CN 103424922 A 12/2013
TW M547699 U 8/2017
TW M553011 U 12/2017

*Primary Examiner* — Ryan A Lubit
(74) *Attorney, Agent, or Firm* — MUNCY, GEISSLER, OLDS & LOWE, P.C.

(57) ABSTRACT

An electronic device includes a panel. The panel includes a plurality of scan electrodes, a plurality of data electrodes and a cholesteric liquid crystal layer. The plurality of data electrodes and the plurality of scan electrodes are intersected with each other to define a plurality of pixels. The cholesteric liquid crystal layer is disposed between the plurality of scan electrodes and the plurality of data electrodes. In a writing mode, a first voltage difference is applied to at least one pixel disposed in a writing area, and a second voltage difference is applied to at least a portion of the other pixels disposed in a non-writing area. In an erasing mode, a third voltage difference is applied to at least one pixel disposed in an erasing area, where the first voltage difference is different from the second voltage difference, and the first voltage difference is different from the third voltage difference.

19 Claims, 13 Drawing Sheets

(56) References Cited

U.S. PATENT DOCUMENTS

| | | | | |
|---|---|---|---|---|
| 2019/0056611 | A1* | 2/2019 | Marhefka | G06F 3/04883 |
| 2019/0302503 | A1* | 10/2019 | Liao | G02F 1/134336 |
| 2020/0142581 | A1* | 5/2020 | Li | G06F 3/0445 |

* cited by examiner

ELECTRONIC DEVICE

CROSS-REFERENCE TO RELATED APPLICATIONS

This application claims the benefits of the Chinese Patent Application Serial Number 202310258740.4, filed on Mar. 17, 2023, the subject matter of which is incorporated herein by reference.

BACKGROUND

Field of the Disclosure

The present disclosure relates to an electronic device and, more particularly, to an electronic device that drives cholesteric liquid crystal.

Description of Related Art

Current electronic devices, such as display devices, are equipped with a cholesteric liquid crystal layer so as to adapt to product applications (such as e-books, electronic paper, etc.), thereby forming cholesteric liquid crystal display devices. For applications such as e-books and electronic paper, the cholesteric liquid crystal display device has to be provided with handwriting function, such as writing and erasing. The handwriting function of current cholesteric liquid crystal display device must provide the same voltage to all pixels on the entire panel at the same time, which cannot achieve local control and therefore consumes more energy. Moreover, the current cholesteric liquid crystal display device cannot perform partial erasing of the written position.

Therefore, there is a need to provide an improved electronic device to mitigate and/or obviate the aforementioned problems.

SUMMARY

The present disclosure provides an electronic device, which comprises: a panel including: a plurality of scan electrodes; a plurality of data electrodes intersected with the plurality of scan electrodes to define a plurality of pixels; and a cholesteric liquid crystal layer disposed between the plurality of scan electrodes and the plurality of data electrodes, wherein, in a writing mode, a first voltage difference is applied to at least one pixel disposed in a writing area, and a second voltage difference is applied to at least a portion of the other pixels disposed in a non-writing area, and in an erasing mode, a third voltage difference is applied to at least one pixel disposed in an erasing area, where the first voltage difference is different from the second voltage difference, and the first voltage difference is different from the third voltage difference.

Other novel features of the disclosure will become more apparent from the following detailed description when taken in conjunction with the accompanying drawings.

DETAILED DESCRIPTION OF EMBODIMENT

Figure 1:
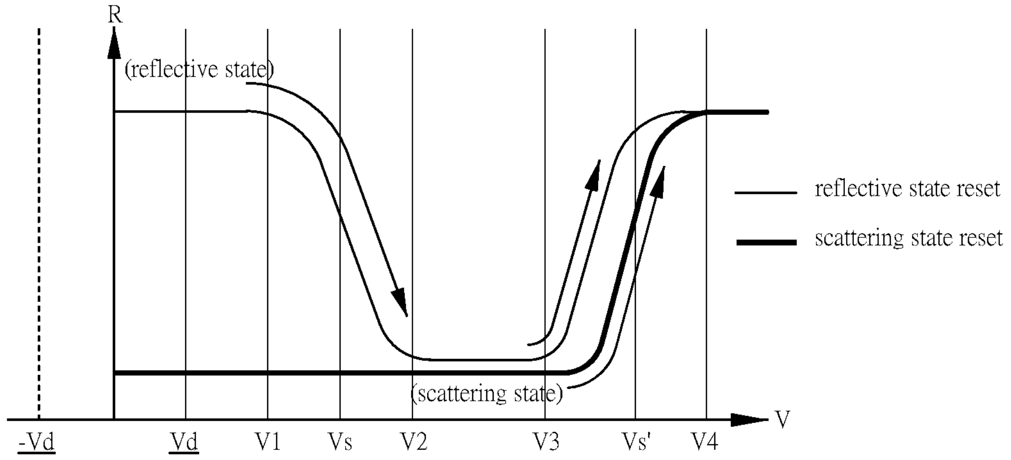
FIG. 1 is a graph of voltage difference versus reflectivity of cholesteric liquid crystal according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "containing" and "comprising" are open-ended words, and should be interpreted as meaning "including but not limited to".

Directional terms mentioned in the specification, such as "up", "down", "front", "rear", "left", "right", etc., only refer to the directions of the drawings. Accordingly, the directional term used is illustrative, not limiting, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or a non-physical structure, which is not limited. In the present disclosure, when a certain structure is arranged "on" other structures, it may mean that a certain structure is "directly" on other structures, or it means that a certain structure is "indirectly" on other structures; that is, at least one structure is sandwiched, in between a certain structure and other structures.

The terms, such as "about", "equal to", "equal" or "same", "substantially", or "substantially", are generally interpreted as within 20% of a given value or range, or as within 10%, 5%, 3%, 2%, 1%, or 0.5% of a given value or range.

Furthermore, any two values or directions used for comparison may have certain errors. If the first value is equal to the second value, it implies that there may be an error of about 10% between the first value and the second value. If the first direction is perpendicular or "approximately" perpendicular to the second direction, the angle between the first direction and the second direction may be between 80 degrees and 100 degrees. If the first direction is parallel or "substantially" parallel to the second direction, the angle between the first direction and the second direction may be between 0 degrees and 10 degrees.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

In the present disclosure, the terms "the given range is from the first numerical value to the second numerical value" or "the given range falls within the range from the first numerical value to the second numerical value" indicates that the given range includes the first numerical value, the second numerical value, and other values therebetween.

In addition, the method disclosed in the present disclosure may be used in electronic devices, and the electronic devices may include imaging devices, assembling devices, display devices, backlight devices, antenna devices, sensing devices, tiled devices, touch display devices, curved display devices or free shape display devices, but not limited thereto. When the electronic device is an assembling device or a tiled device, the electronic device may include a grabbing mechanism, but not limited thereto. The electronic device may include, for example, liquid crystal, light emitting diode, fluorescence, phosphor, other suitable display media, or a combination thereof, but not limited thereto. The display device may be a non-self-luminous display device or a self-luminous display device. The antenna device may be a liquid crystal type antenna device or a non-liquid crystal type antenna device, and the sensing device may be a sensing device for sensing capacitance, light, thermal energy or ultrasonic waves, but not limited thereto. The tiled device may be, for example, a display tiled device or an antenna tiled device, but not limited thereto. It should be noted that the electronic device may be any permutation and combination of the aforementioned, but not limited thereto. In addition, the electronic device may be a bendable or flexible electronic device. It should be noted that the electronic device may be any permutation and combination of the aforementioned, but not limited thereto. In addition, the shape of the electronic device may be rectangular, circular, polygonal, with curved edges, or other suitable shapes. The electronic device may have peripheral systems such as a drive system, a control system, a light source system, a shelf system, etc. to support a display device, an antenna device or a tiled device.

It should be noted that, in the following embodiments, without departing from the spirit of the present disclosure, the features in several different embodiments may be replaced, reorganized, and mixed to complete other embodiments. As long as the features of the various embodiments do not violate the spirit of the invention or conflict with each other, they can be mixed and matched arbitrarily.

Unless otherwise defined, all terms (including technical and scientific terms) used herein have the same meaning as commonly understood by those skilled in the art related to the present disclosure. It can be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiment of the present disclosure.

In addition, the term "adjacent" in the specification and claims is used to describe mutual proximity, and does not necessarily mean mutual contact.

In addition, the description of "when" or "while" in the present disclosure means "now, before, or after", etc., and is not limited to occurrence at the same time. In the present disclosure, the similar description of "disposed on" or the like refers to the corresponding positional relationship between the two components, and does not limit whether there is contact between the two components, unless specifically limited. Furthermore, when the present disclosure recites multiple effects, if the word "or" is used between the effects, it means that the effects can exist independently, but it does not exclude that multiple effects can exist at the same time.

In addition, the terms "electrically connected" or "coupled" in the specification and claims not only refer to direct electrical connection with another component, but also indirect electrical connection with another component. The electrical connection may include a direct electrical connection, an indirect electrical connection, or a mode in which two components communicate through radio signals.

For convenience of description, the electronic device will be described below in the form of a display device, but the present disclosure is not limited thereto.

Before describing the electronic device of the present disclosure, the characteristics of cholesteric liquid crystal will be depicted first. FIG. 1 is a graph of voltage difference versus reflectivity of a cholesteric liquid crystal according to an embodiment of the present disclosure. As shown in FIG. 1, when the voltage difference applied to the cholesteric liquid crystal changes, the cholesteric liquid crystal may be in a reflective state, a scattering state, or a transmissive state according to the change in voltage difference. The reflective state or the scattering state is a stable state, and the transmissive state is a transient state. In the reflective state, the cholesteric liquid crystal, for example, reflects light of a specific wavelength, and may present a bright screen at this time, so that the reflective state may be regarded as a "bright state". In the scattering state, the panel formed by the cholesteric liquid crystal may present a black screen, so that the scattering state may be regarded as a "dark state". In the transmissive state, light will penetrate the cholesteric liquid crystal. At this moment, by removing the externally applied voltage, the cholesteric liquid crystal can be transformed back to the reflective state.

As shown in FIG. 1, assuming that the initial state of the cholesteric liquid crystal is the reflective state, when the voltage value of the voltage difference applied to the cholesteric liquid crystal is Vd, the voltage value Vd is, for example, a voltage difference formed by a scanning voltage (for example, voltage of 0) matching with the data voltage (for example, voltage of Vd or −Vd), but not limited thereto. The method of forming the voltage difference may be adjusted according to the requirements. At this moment, the cholesteric liquid crystal in each pixel is maintained in a reflective state, for example. When the value of the voltage difference applied increases to the voltage value V1, part of the cholesteric liquid crystals in the pixels corresponding to the applied voltage value V1 are, for example, gradually transformed into a scattering state, while most of the cholesteric liquid crystals corresponding to the applied voltage value V1 are still in the reflective state. When the value of the voltage difference applied increases from the voltage value V1 to the voltage value V2, for example, most of the cholesteric liquid crystals in the pixels corresponding to the applied voltage value (V2) are transformed into a scattering state. When the value of the voltage difference applied increases from the voltage value V2 to the voltage value V3, part of the cholesteric liquid crystals in the pixel corresponding to the voltage value V3 is, for example, gradually transformed into a transmissive state, but the other part of the cholesteric liquid crystals are still in a scattering state. When the value of the voltage difference applied increases to the voltage value V4, most of the cholesteric liquid crystals in the pixels corresponding to the applied voltage value V4 have been, for example, transited into the transmissive state and, at this moment, if the externally applied voltage is removed to change the voltage difference applied to the cholesteric liquid crystal to 0V, the cholesteric liquid crystal may be, for example, transformed back to a reflective state.

In another embodiment, assuming that the initial state of the cholesteric liquid crystal is the scattering state, when the voltage value of the voltage difference is Vd, voltage value V1 or voltage value V2, the cholesteric liquid crystal to which the voltage difference is applied is, for example, maintained in the scattering state. When the voltage difference increases to the voltage value V3, part of the cholesteric liquid crystals in the pixels corresponding to the voltage value V3 are gradually transformed into the transmissive state, while the other part is still in a scattering state. When the voltage difference increases to the voltage value V4, most of the cholesteric liquid crystals in the pixels have been, for example, transformed into the transmissive state. At this moment, if the externally applied voltage is removed and the voltage difference applied to the cholesteric liquid crystal changes to 0, the cholesteric liquid crystal may be, for example, transformed back to reflective state. As a result, the characteristics of the voltage value of voltage difference versus reflectivity of the cholesteric liquid crystal in different initial states can be understood.

To facilitate the description of subsequent paragraphs, the voltage value between the voltage value V1 and the voltage value V2 is defined as the first setting voltage value Vs (that is, V1<Vs<V2), and the voltage value between the voltage value V3 and the voltage value V4 is defined as a second setting voltage value Vs' (that is, V3<Vs'<V4). In one embodiment, the first setting voltage value Vs may be, for example, an average value of the voltage value V1 and the voltage value V2 (that is, Vs=(V1+V2)/2), but not limited thereto. In one embodiment, the second setting voltage value Vs' may be, for example, an average value of the voltage value V3 and the voltage value V4 (that is, Vs'=(V3+V4)/2), but not limited thereto.

Figure 2:
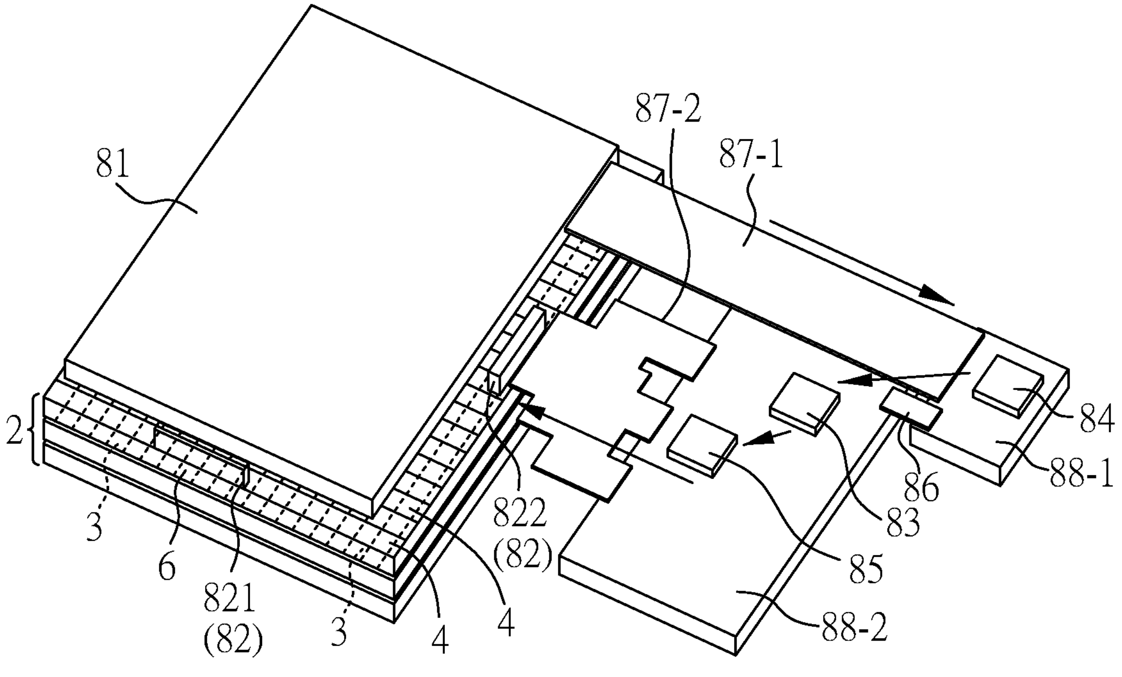
FIG. 2 is a schematic diagram of an electronic device according to an embodiment of the present disclosure.

Next, the electronic device 1 of the present disclosure will be described. FIG. 2 is a schematic diagram of an electronic device 1 according to an embodiment of the present disclosure. As shown in FIG. 2, the electronic device 1 includes a panel 2. The panel 2 may include a plurality of scan electrodes 3, a plurality of data electrodes 4 and a cholesteric liquid crystal layer 6. The cholesteric liquid crystal layer 6 may be disposed between the plurality of scan electrodes 3 and the plurality of data electrodes 4, and the plurality of data electrodes 4 and the plurality of scan electrodes 3 are intersected to define a plurality of pixels 5.

Figure 3A:
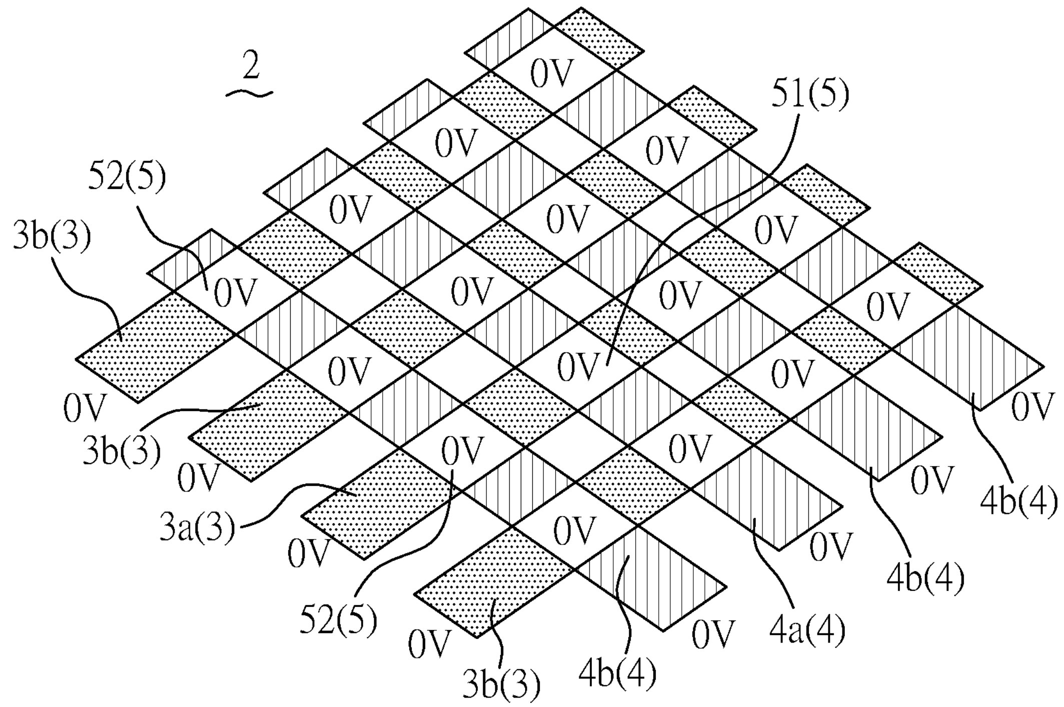
FIGS. 3(*a*) to 3(*c*) are schematic diagrams illustrating a driving process of the electronic device according to the first embodiment of the present disclosure.
Figure 3B:
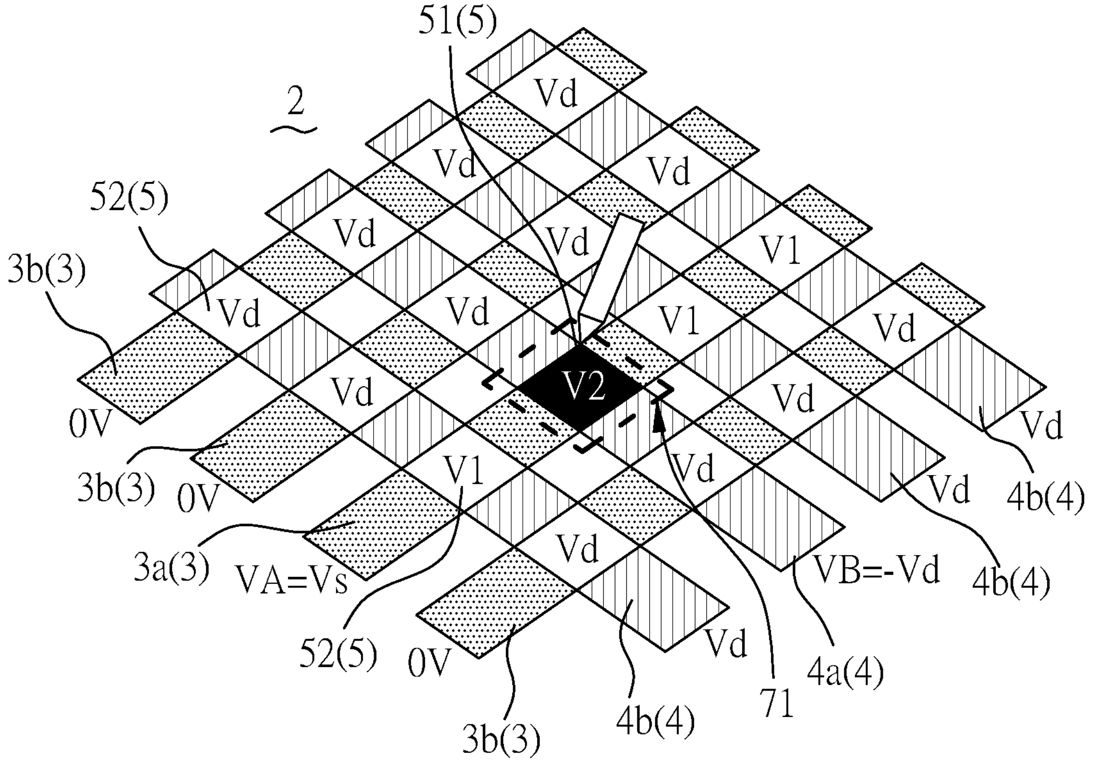
Figure 3C:
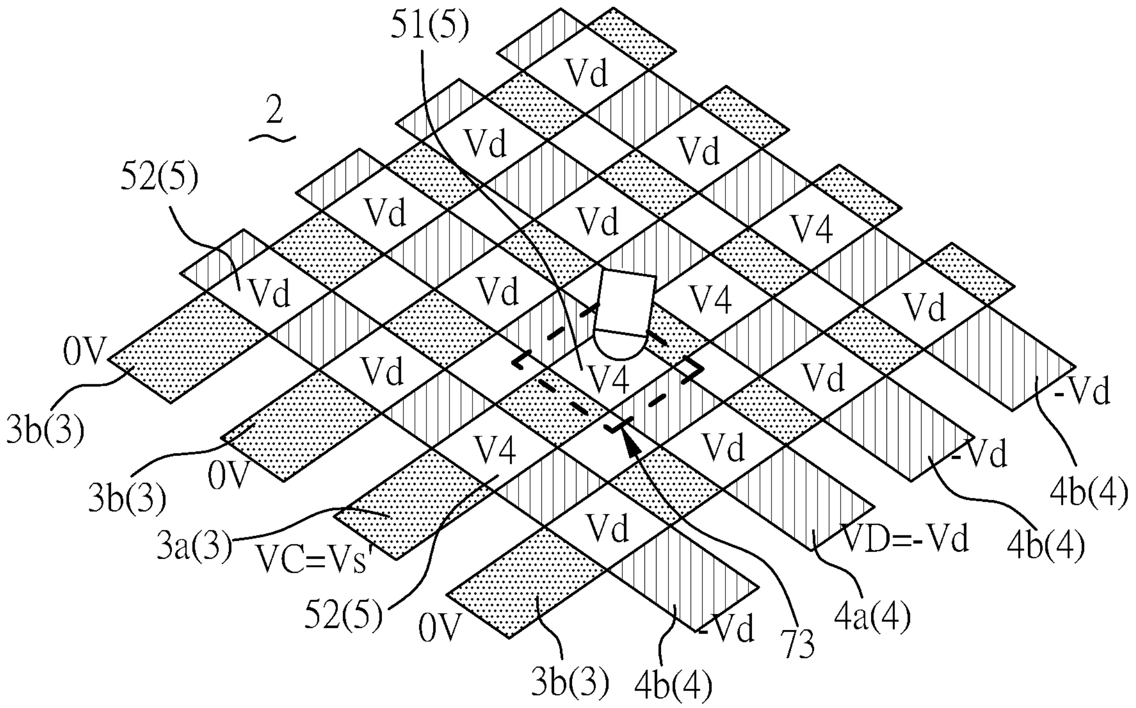

FIGS. 3(*a*) to 3(*c*) are schematic diagrams illustrating a driving process of the electronic device 1 according to the first embodiment of the present disclosure, and please refer to FIG. 1 and FIG. 2 at the same time. It should be noted that, for clarity of explanation, the cholesteric liquid crystal layer 6 between the scan electrode 3 and the data electrode 4 is not shown in FIGS. 3(*a*) to 3(*c*). FIG. 3(*a*) shows the initial state of the panel 2, FIG. 3(*b*) shows the driving of the panel 2 in a writing mode of the electronic device 1, and FIG. 3(*c*) shows the driving of the panel 2 in an erasing mode of the electronic device 1.

As shown in FIG. 3(*a*), the initial state of the panel 2 is such that, for example, all pixels 5 are in the reflective state (i.e., a bright state). At this moment, for example, no voltage is applied to each of the scan electrodes 3 and data electrodes 4, that is, the voltage difference between the scan electrode 3 and the data electrode 4 is 0V.

As shown in FIG. 3(*b*), when the electronic device 1 enters the writing mode and, for example, an object (including a finger, a stylus or other object suitable for writing) touches the panel 2 to perform writing, at least one pixel 51 disposed in the writing area 71 (for example, the area where the touched or written pixel is disposed) is applied with a first voltage difference (for example, the voltage value V2), and at least part of the other pixels 51 disposed in the non-writing area 71 (for example, the area other than the writing area) is applied with a second voltage difference (for example, the voltage value V1 or the voltage value Vd). Furthermore, as shown in FIG. 3(*c*), when the electronic device enters the erasing mode and, for example, an object (such as an eraser or other object suitable for erasure) touches the panel 2 to erase traces of writing, at least one pixel 51 disposed in the erasing area 73 is, for example, applied with a third voltage difference (for example, the voltage value V4) in the erasing mode. The first voltage difference (for example, the voltage value V2) is different from the second voltage difference (for example, the voltage value V1 or the voltage value Vd), and the first voltage difference (for example, the voltage value V2) is different from the third voltage difference (for example, the voltage value V4). In one embodiment, the pixel (pixel 51) disposed in the erasing area 73 is the same as the pixel (pixel 51) disposed in the writing area 71, but not limited thereto.

The details of the writing mode will be further described. In the writing mode (as shown in FIG. 3(*b*)), a first application voltage VA may be applied to the scan electrode 3 that is electrically connected to at least one pixel (for example, the pixel 51) disposed in the writing area 71, and a second application voltage VB may be applied to the data electrode 4 that is electrically connected to at least one pixel of 71 (for example, the pixel 51) disposed in the writing area 71. In one embodiment, for example, neither the first application voltage VA nor the second application voltage VB is 0, but is not limited thereto. In another embodiment, the scan electrode 3*a* electrically connected to at least one pixel (for example, the pixel 51) disposed in the writing area 71 is applied with a first application voltage VA, and the data electrode 4*a* electrically connected to at least one pixel (for example, the pixel 51) disposed in the writing area 71 is applied with a voltage of 0V, that is, the voltage of the second application voltage VB is 0V. In addition, the voltage applied to other scan electrodes 3*b* is 0V, and the voltage Vd may be applied to other data electrodes 4*b*, but not limited thereto. In one embodiment, the first application voltage VA and the second application voltage VB may satisfy the following relationship: |VA|>|VB|, where VA is the first application voltage and VB is the second application voltage, but not limited thereto. In one embodiment, the first application voltage VA and the second application voltage VB may satisfy the following relationship: |VA|=|VB|, where VA is the first application voltage and VB is the second application voltage, but not limited thereto.

In one embodiment, the first application voltage VA may be, for example, the first setting voltage Vs, and the second application voltage VB may be, for example, a negative value of the voltage Vd, as denoted by −Vd. At this moment, the first voltage difference on the pixel 51 may be, for example, the difference between the first application voltage VA and the second application voltage VB (that is, the difference between Vs and −Vd). Therefore, the first voltage difference may be approximate or equal to the voltage value V2. Therefore, the cholesteric liquid crystal of the pixel 51 disposed in the writing area 71 may be, for example, transited from a reflective state (bright state) to a scattering state (dark state). In addition, the second voltage difference on the other pixels 52 in the non-writing area that are electrically connected to the scan electrode 3*a* may be, for example, the difference between the first application voltage VA (for example, the first setting voltage Vs) and the data voltage Vd, that is, the difference between Vs and Vd, and the second voltage difference on the other pixels 52 in the non-writing area that are electrically connected to the scan electrode 3*a* may be approximate or equal to the voltage value V1. Because the second voltage difference (voltage value V1) does not reach the voltage value V2, the cholesteric liquid crystals of the other pixels 52 in the non-writing area that are electrically connected to the scan electrode 3*a* are still kept in the reflective state. Besides, the second voltage difference on the other pixels 52 in the non-writing area that are not electrically connected to the scan electrode 3*a* or the data line 4*a* may be, for example, the difference between zero voltage and the voltage Vd (that is, the difference between 0V and Vd, but not limited thereto). Since the second voltage difference (voltage value Vd) does not reach the voltage value V2, the cholesteric liquid crystals in the other pixels 52 in the non-writing area 73 that are not electrically connected to the scan electrode 3*a* or the data electrode 4*a* are still kept in the reflective state. As a result, in the writing mode, the pixel 51 that is touched or written may be in a dark state, while the pixel 52 that is not touched or written may be kept in a bright state, thereby achieving the writing effect, but not limited thereto.

The above numerical values are only examples and may be changed according to actual requirements. For example, the voltage of the first application voltage VA may be, for example, V2, and the second application voltage VB may be, for example, 0V. In this case, the first voltage difference may be the voltage value V2 (that is, the difference between V2 and 0), so that the cholesteric liquid crystal of at least one pixel may still be transited into a scattering state. In another embodiment, the voltage of the first application voltage VA may be, for example, half of the positive voltage value V2 (that is, V2/2), the voltage of the second application voltage VB may be, for example, half of the negative voltage value −V2 (that is, −V2/2) and, at this moment, the first voltage difference may also be the voltage value V2 (that is, the difference between V2/2 and (−V2/2)), so that the cholesteric liquid crystal of at least one pixel 51 may still be transited to the scattering state, In this embodiment, the first application voltage VA and the second applied voltage VB satisfy the following relationship: |VA|=|VB|. In addition, the voltage applied to the other pixels 52 may also be adjusted, as long as the second voltage difference is smaller than or equal to the first voltage V1 (that is, the other pixels 52 are kept in the bright state). In addition, the polarities of the first application voltage VA and the second application voltage VB in the aforementioned example may also be interchanged. It should be noted that the numerical values of each embodiment below may be changed accordingly and are not limited thereto.

Accordingly, the writing mode of the first embodiment can be understood.

Next, the details of the erasing mode of the first embodiment will be described. In the erasing mode (FIG. 3*c*), a third application voltage VC may be applied to the scan electrode 3*a* electrically connected to at least one pixel (for example, the pixel 51) disposed in the erasing area 73, and a fourth applied voltage VD may be applied to the data electrode 4*a* electrically connected to at least one pixel (for example, the pixel 51) disposed in the erasing area 73, while neither the third application voltage VC nor the fourth application voltage VD may be zero. In one embodiment, the third application voltage VC and the fourth application voltage VD satisfy the following relationship: [VC|>|VD], where VC is the third application voltage and VD is the fourth application voltage, but not limited thereto. In one embodiment, the third application voltage VC may be, for example, the second setting voltage Vs', and the fourth application voltage VD may be, for example, a negative voltage −Vd. At this moment, the third voltage difference applied to the pixel 51 disposed in the erasing area 73 may be, for example, the difference between the third application voltage VC and the fourth application voltage VD (that is, the difference between Vs' and −Vd). Therefore, the third voltage difference may be approximate or equal to the voltage value V4, the cholesteric liquid crystal of the pixel 51 disposed in the erasing area 73 may be, for example, transited to a transmissive state, and may be transited to a reflective state when the voltage difference in this area is removed.

In addition, in the erasing mode, the voltage applied to the other scan electrodes 3*b* is 0V, and the voltage applied to the other data electrodes 4*b* may be −Vd, for example, but not limited thereto. In other words, the voltage difference on the other pixels (pixels 52) electrically connected to the data electrode 3*b* and the data electrode 4*b* may be, for example, the difference between the zero voltage value (0V) and the voltage −Vd. The absolute value of this voltage difference is Vd and, because these voltage differences do not reach the voltage value V2, these pixels 52 may be still kept in the reflective state. In some embodiments, the voltage difference on other pixels 52 electrically connected to the scan electrode 3*a* may be, for example, the difference between the third application voltage VC and the voltage −Vd (that is, the difference between Vs' and −Vd), so that the voltage difference on the other pixels 52 electrically connected to the scan electrode 3*a* may be approximate or equal to the fourth voltage V4. Therefore, after the fourth voltage V4 is removed, the other pixels 52 electrically connected to the scan electrode 3*a* may be in a reflective state. As a result, the pixels 51 in the erasing area 73 may be in a reflective state (bright state), while the other pixels 52 that are not erased may be kept in a reflective state (bright state), for example. The aforementioned values are only examples and may be changed according to the actual needs.

As a result, the erasing mode of the first embodiment can be understood.

Please refer to FIG. 2 again. In order to achieve the aforementioned driving of writing mode and/or erasing mode, in one embodiment, the electronic device 1 further includes a detection element 81, a driving circuit 82, and a controller 83, a touch chip 84, a timing controller 85, an electrical connector 86, a circuit board 87-1 (such as a flexible circuit board, but not limited thereto), at least one or more circuit boards 87-2 (such as flexible circuit boards, but not limited thereto), a circuit board 88-1 (such as a rigid circuit board, but not limited thereto this) and/or a circuit board 88-2 (such as a rigid circuit board, but not limited thereto), wherein the detection element 81 is disposed, for example, adjacent to the panel 2, the driving circuit 82 is used to drive a plurality of pixels 5, and the controller 83 is electrically connected between the detection element 81 and the driving circuit 82. In addition, the driving circuit 82 may include a first driving circuit 821 and a second driving circuit 822. The aforementioned components are only examples and may be added or removed according to the actual needs.

The detection element 81 may be adjacent to the panel 2, for example, may be disposed on the panel 2, and may be selectively in contact or not in contact with the panel 2, for example. The detection element 81 may be electrically connected to the chip 84 through the circuit board 87-1 and the circuit board 88-1. The chip 84 may be disposed on the circuit board 88-1, for example. The circuit board 88-1 may be electrically connected to circuit board 88-2 through the connector 86, for example. The controller 83 and the timing controller 85 may be disposed on the circuit board 88-2, for example. The circuit board 88-2 may be electrically connected to at least one panel 2 through at least one circuit board 87-2, for example. The first driving circuit 821 and the second driving circuit 822 may be, for example, electrically connected to the panel 2. For example, the first driving circuit 821 may be electrically connected to the scan electrode 3 of the panel 2, and the second driving circuit 822 may be electrically connected to the data electrode 4 of the panel 2, while it is not limited thereto.

In one embodiment, in the writing mode, the detection element 81 may detect a writing position (such as the position of at least one pixel 51 that is touched or written), and provide the writing position to the controller 83. The controller 83 may send driving information to the driving circuit 82 according to the coordinate information of the writing position. The driving circuit 82 may provide the first voltage difference to at least one pixel 51 of the writing area 71 according to the driving information, and may the second voltage difference to at least part of the other pixels 52 in the non-writing area according to the driving information. In the following, a more detailed description is given. The detection element 81 may, for example, transmit the writing position to the chip 84 (for example, a touch chip). The chip 84 may generate coordinate information of the writing position based on the writing position, and send the coordinate information of the writing position to the controller 83. Then, the controller 83 may send driving information to the driving circuit 82 according to the coordinate information of the writing position. The driving circuit 82 may apply the first voltage difference to at least one pixel 51 in the writing area 71 according to the driving information, and may apply the second voltage difference to at least part of the other pixels 52 in the non-writing area 71 according to the driving information. For example, the controller 83 may generate control information based on the coordinate information of the writing position, and send the control information to the timing controller 85. According to the control information, the timing controller 85 may control the first driving circuit 821 to apply the first application voltage VA to the scan electrode 3*a* (as shown in FIG. 3(*b*)), and control the first driving circuit 821 to apply the third application voltage VC to the other scan electrodes 3*b* (as shown in FIG. 3(*b*)). Furthermore, according to the control information, the timing controller 85 may control the second driving circuit 822 to apply the second application voltage VB to the data electrode 4*a* (as shown in FIG. 3(*b*)), and control the second driving circuit 822 to apply the fourth application voltage VD to the other data electrodes 4*b* (as shown in FIG. 3(*b*)), thereby applying the first voltage difference to the at least one pixel 51 in the writing area 71, while it is not limited thereto. As a result, the writing mode of the electronic device 1 can be realized.

In one embodiment, in the erasing mode, the detection element 81 may detect an erasing position (such as the position of at least one pixel 51 in the erasing area 73), and provide the erasing position to the controller 83. The controller 83 may send another driving information to the driving circuit 82 according to the coordinate information of the erasing position. The driving circuit 82 may apply a third voltage difference to at least one pixel 51 of the erasing area 73 according to the other driving information, and can also apply the third voltage to at least one pixel 51 of the erasing area 73 according to the another driving information. A fourth voltage is applied to at least a portion of the other pixels 52 in the non-writing area. As described in more detail below, the detection element 81 may send the detected erasing position to the chip 84. The chip 84 may generate coordinate information of the erasing position according to the erasing position, and send the coordinate information of the erasing position to the controller 83. The controller 83 may send another driving information to the driving circuit 82 according to the coordinate information of the erasing position. The driving circuit 82 may apply a third voltage difference to at least one pixel 51 of the erasing area 73 according to the another driving information, and may apply a fourth voltage difference to at least a portion of the other pixels 52 in the non-erasing area according to the another driving information. For example, the controller 83 may generate another control information based on the coordinate information of the erasing position, and send the another control information to the timing controller 85. Then, the timing controller 85 may control the first driving circuit 821 to apply the third application voltage VC to the scan electrode 3*a* (as shown in FIG. 3(*c*)) according to another control information, and control the first driving circuit 821 to apply another voltage (for example, 0V) to the other scan electrodes 3*b* (as shown in FIG. 3(*c*)). Moreover, the timing controller 85 may control the second driving circuit 822 to apply the fourth application voltage VD to the data electrode 4*a* according to another control information (as shown in FIG. 3(*c*)), and control the second driving circuit 822 to apply a voltage (for example −Vd) to the other data electrodes 4*b* (as shown in FIG. 3(*c*)), so that at least one pixel 51 in the erasing area 71 is applied with the third voltage difference, while it is not limited thereto. As a result, the erasing mode of the electronic device 1 can be realized.

The description of the embodiment of FIG. 2 may also be applicable to the driving of writing mode or erasing mode in the following embodiments, while it is not limited thereto.

Figure 4A:
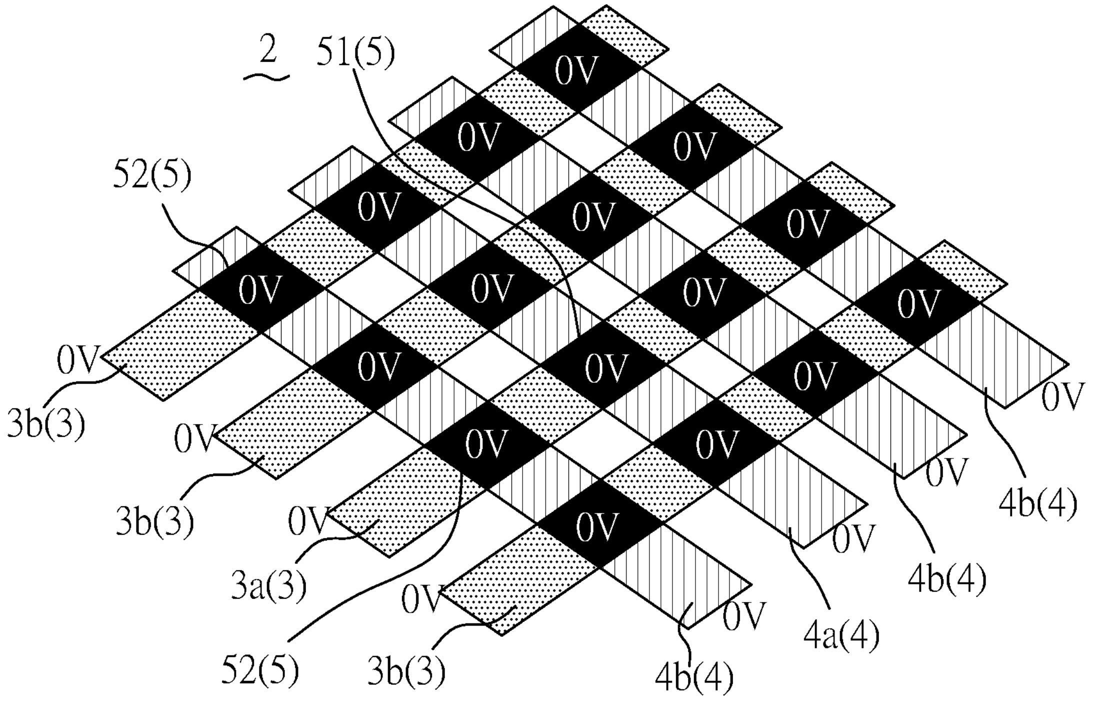
FIGS. 4(*a*) to 4(*c*) are schematic diagrams illustrating a driving process of the electronic device according to the second embodiment of the present disclosure.
Figure 4B:
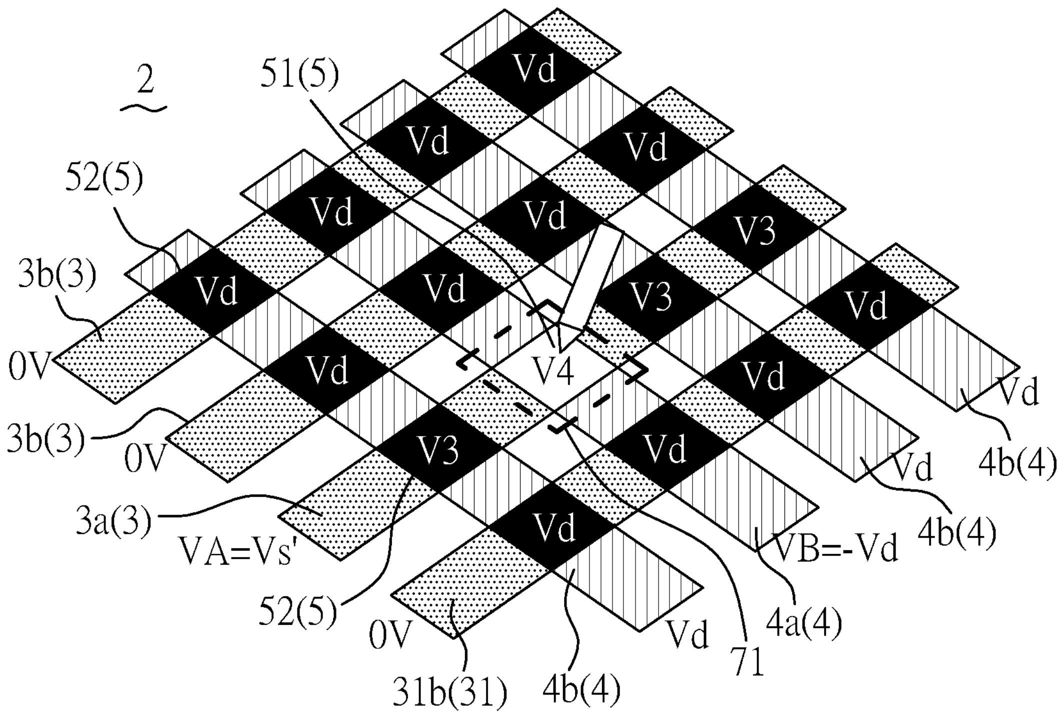
Figure 4C:
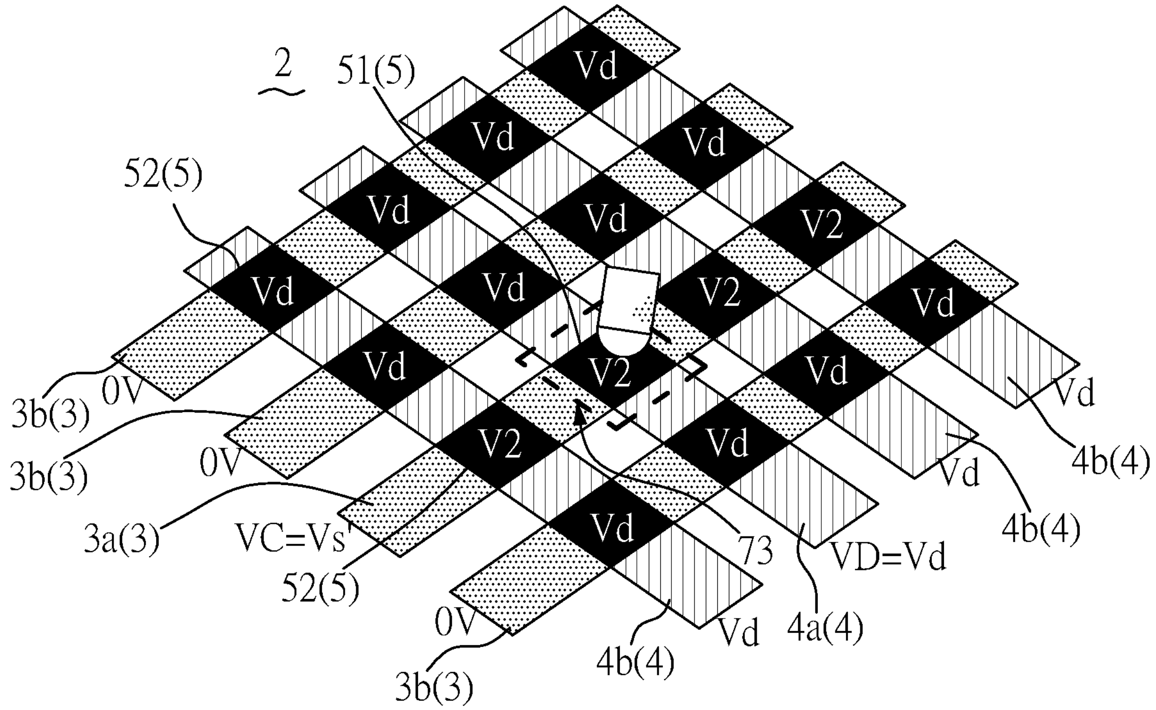

The electronic device 1 of the present disclosure may also be equipped with different driving methods. FIG. 4(*a*) to FIG. 4(*c*) are schematic diagrams illustrating the driving process of the electronic device 1 according to the second embodiment of the present disclosure, and please refer to FIGS. 1 to 3 at the same time. It is noted that, for clarity of description, the cholesteric liquid crystal layer 6 between the scan electrodes 3 and the data electrodes 4 is not shown in FIG. 4(*a*) to FIG. 4(*c*). FIG. 4(*a*) shows the initial state of the panel 2, FIG. 4(*b*) shows the driving state of the panel 2 in the writing mode, and FIG. 4(*c*) shows the driving state of the panel 2 in the erasing mode.

As shown in FIG. 4(*a*), the initial state of the panel 2 is, for example, a scattering state (i.e., a dark state); that is, the cholesteric liquid crystals of all pixels 5 are in a scattering state. At this moment, the voltage applied to each scan electrode 3 and data electrode 4 is, for example, 0V, so that the voltage difference on each pixel 5 is also zero voltage, but not limited thereto.

As shown in FIG. 4(*b*), in the writing mode, at least one pixel 51 disposed in the writing area 71 is applied with a first voltage difference (for example, the voltage value V4), and at least a portion of the other pixels 52 disposed in the non-writing area (that is, the area other than the writing area 71) is applied with a second voltage difference (for example, the voltage value V3 or the voltage value Vd). Moreover, as shown in FIG. 4(*c*), in the erasing mode, at least one pixel 51 disposed in the erasing area 73 is applied with a third voltage difference (for example, voltage value V2). The first voltage difference (for example, voltage value V4) is different from the second voltage difference (for example, voltage value V3 or voltage value Vd), and the first voltage difference (for example, voltage value V4) is different from the second voltage difference (for example, voltage value V2).

In more detail, in the writing mode (FIG. 4(*b*)), the scan electrode 3*a* connected to at least one pixel 51 in the writing area 71 may be applied with a first application voltage VA that is not 0V, and the data electrode 4*a* connected to at least one pixel 51A may be applied with a second application voltage VB that is not 0V. In one embodiment, the first application voltage VA may be, for example, the second setting voltage Vs', and the second application voltage VB may be, for example, the voltage −Vd. Therefore, the first voltage difference on the pixel 51 may be approximate or equal to the fourth voltage V4 (for example, the difference between Vs' and −Vd), so that the cholesteric liquid crystal of the pixel 51 may, for example, change from a scattering state to a transmissive state (that is, a bright state). The first application voltage VA and the second application voltage VB may satisfy the following relationship: |VA|>|VB|, but not limited thereto.

The second voltage difference on the other pixels 52 in the non-writing area (that is, the area other than the writing area 71) and electrically connected to the scan electrode 3*a* may be, for example, the difference between the first application voltage VA and the voltage Vd (that is, the difference between Vs' and Vd). Therefore, the second voltage difference on the other pixels 52 in the non-writing area that are electrically connected to the scan electrode 3*a* may be approximate or equal to the voltage value V3, so that the scattering state (dark state) is still kept. In addition, the second voltage difference on other pixels 52 in the non-writing area that are not electrically connected to the scan electrode 3*a* or the data electrode 4*a* may be, for example, the voltage value Vd. If it is desired to make the cholesteric liquid crystal transited from the scattering state to the reflective state by applying a voltage, the cholesteric liquid crystal has to be transited to the transmissive state first and then to the reflective state. If the voltage value Vd of the voltage difference is insufficient to make the cholesteric liquid crystal transited to the transmissive state, it is still kept in the scattering state (dark state). In other words, the other scan electrodes 3*b* may be applied with a voltage of 0V, and the other data electrodes 4*b* may be applied with a voltage of Vd, for example. As a result, the pixel 51 that is touched or written may be, for example, in a bright state, while the pixel 52 that is not touched or written may be kept in a dark state. Similar to the first embodiment, the aforementioned values may also be adjusted.

In addition, in the erasing mode (FIG. 4(*c*)), the scan electrode 3*a* electrically connected to at least one pixel 51 in the erasing area 73 may be applied with a third application voltage VC that is not 0V, and the data electrode 4*a* electrically connected to the at least one pixel 51 may be applied with a fourth application voltage VD that is not 0V. In one embodiment, the third application voltage VC may be, for example, the second setting voltage Vs', and the fourth application voltage VD may be, for example, the voltage Vd. At this moment, the third voltage difference on the pixel 51 disposed in the erasing area 73 may be approximate or equal to the voltage value V3, so that the cholesteric liquid crystal of the pixel 51 disposed in the erasing area 73 may be, for example, transited from a reflective state to a scattering state (dark state). In the erasing mode, the third application voltage VC and the fourth application voltage VD may satisfy the following relationship: |VC|>|VD|, but not limited thereto.

In addition, the fourth voltage difference on the other pixels 52 electrically connected to the scan electrode 3*a* may be, for example, the difference between the third application voltage VC (for example, Vs') and the voltage Vd, so that the fourth voltage difference may be, for example, approximate or equal to the voltage value V3, and thus the scattering state (dark state) is still kept. The voltage applied to the other scan electrodes 3*b* is 0V, and the voltage applied to the other data electrodes 4*b* may be Vd, for example, but not limited thereto.

In addition, the fourth voltage difference on other pixels 52 that are not electrically connected to the scan electrode 3*a* and the data electrode 4*a* (that is, the other pixels 52 that are electrically connected to the scan electrodes 3*b* and the data electrodes 4*b*) may be, for example, a voltage value Vd. As this voltage difference Vd is insufficient to make the cholesteric liquid crystal transited from the scattering state to the transmissive state, the scattering state (dark state) is still kept. In addition, the fourth voltage difference on other pixels 52 electrically connected to the data electrode 4*a* may be, for example, the difference between zero voltage and the fourth application voltage VD (for example, Vd). The fourth voltage difference may be, for example, approximately voltage −Vd, which is insufficient to make the cholesteric liquid crystal transited from the scattering state to the transmissive state, so that the scattering state (dark state) is still kept. As a result, the touched pixel 51 may be in a dark state (that is, the writing is erased), while the untouched pixel 52 may be kept in a dark state.

As a result, the second embodiment can be understood.

Figure 5A:
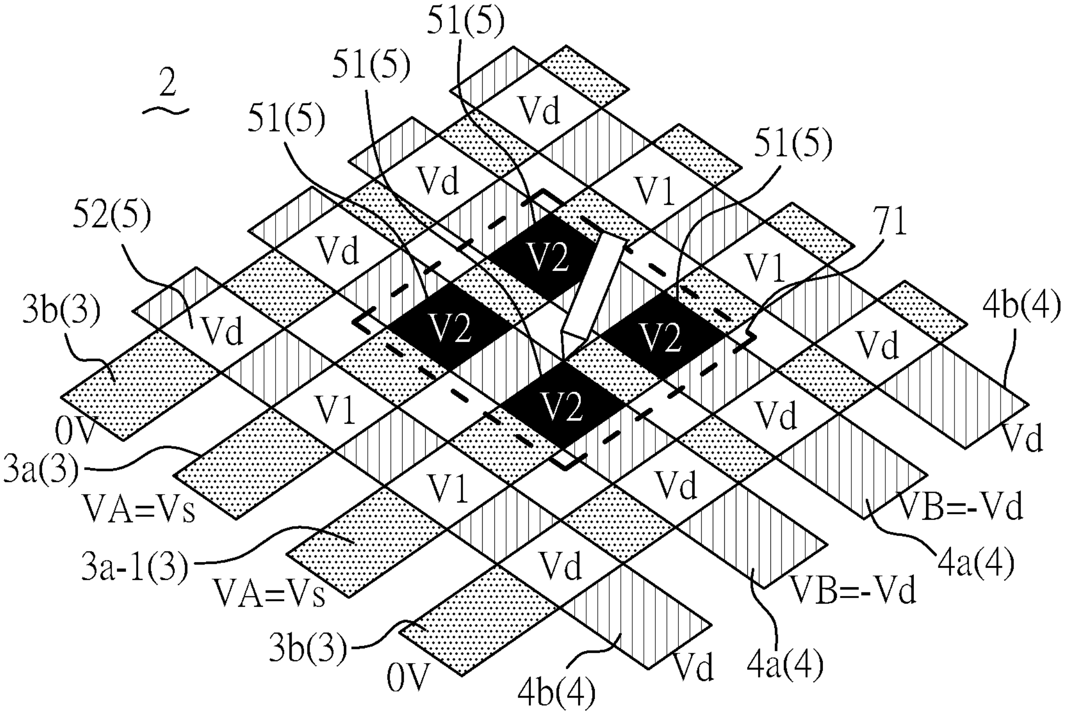
FIGS. 5(*a*) to 5(*c*) are schematic diagrams illustrating a driving process of the electronic device according to the third embodiment of the present disclosure.
Figure 5B:
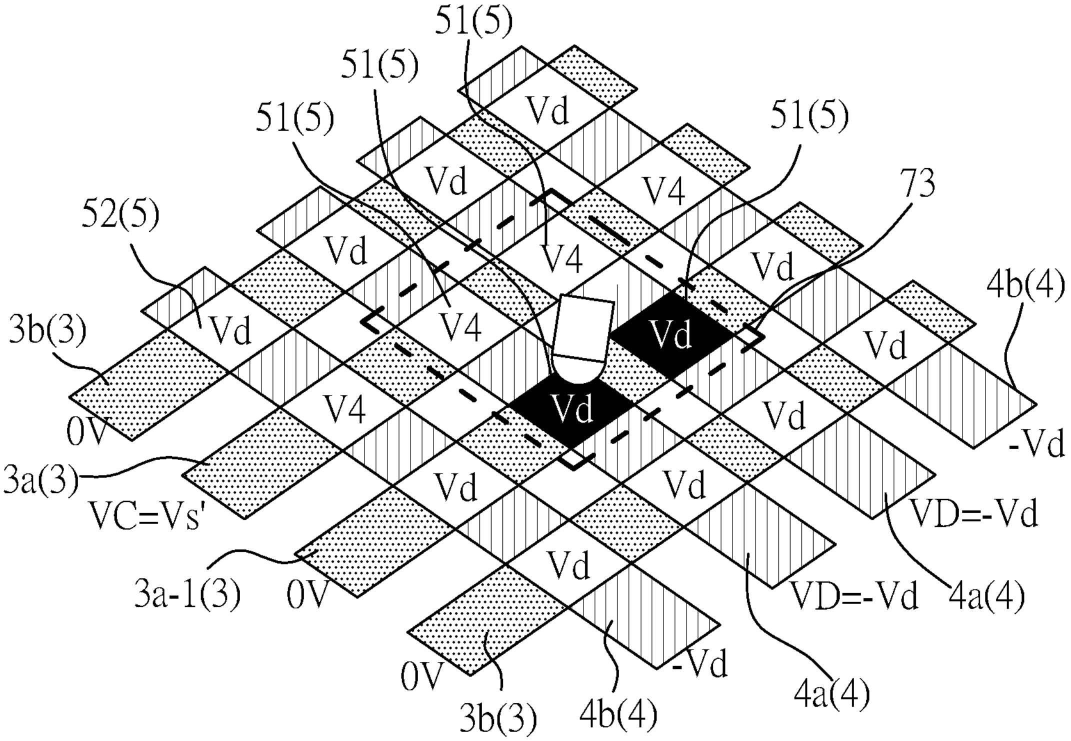
Figure 5C:
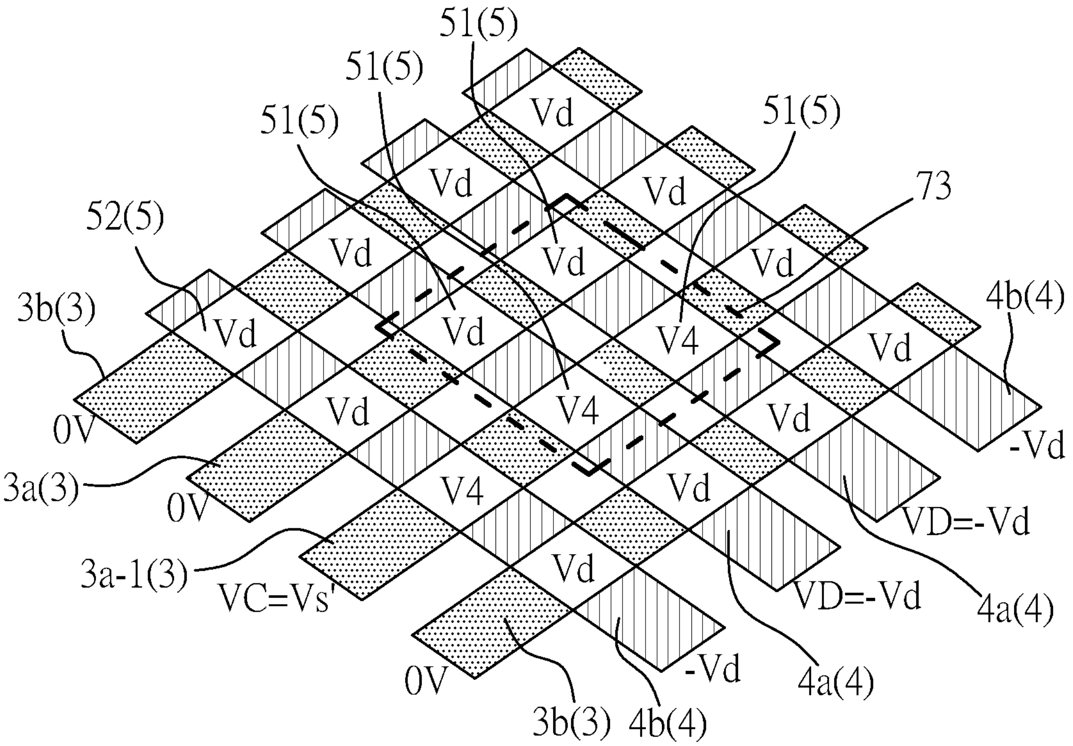

The electronic device 1 of the present disclosure may also be provided with different driving methods. FIG. 5(*a*) to FIG. 5(*c*) are schematic diagrams illustrating the driving process of the electronic device 1 according to the third embodiment of the present disclosure. The embodiment of FIG. 5(*a*) to FIG. 5(*c*) is used to illustrate the driving process when erasing multiple written pixels 51. It is noted that, in order to make the description clear, the cholesteric liquid crystal layer 6 between the scan electrodes 3 and the data electrodes 4 is not shown in FIGS. 5(*a*) to 5(*c*). FIG. 5(*a*) shows the driving of the panel 2 in the writing mode, and FIG. 5(*b*) and FIG. 5(*c*) show the driving of the panel 2 in the erasing mode at different timings.

The description of the embodiment of FIG. 3 may be applicable to some features of the embodiment of FIGS. 5(*a*) to 5(*c*), and thus the following description mainly focuses on the differences.

As shown in FIG. 5(*a*), assuming that the initial state of the panel 2 is a bright state, in the writing mode, the writing area 71 may, for example, include a plurality of pixels 51; that is, a plurality of pixels 51 in the writing area 71 may be touched or written at the same time or not at the same time so as to be transited from a bright state to a dark state, for example, but not limited thereto. In more detail, in the writing mode, the first application voltage VA applied to the scan electrode 3*a* and the scan electrode 3*a*-1 electrically connected to the plurality of pixels 51 in the writing area 71 may be, for example, a first setting voltage Vs and, for example, the second application voltage VB applied to the two data electrodes 4*a* electrically connected to the plurality of pixels 51 in the writing area 71 may be the voltage −Vd. At this moment, the first voltage difference applied to the plurality of pixels 51 in the writing area 71 may be the voltage value V2, so that the plurality of pixels 51 in the writing area 71 may be, for example, transited from a reflective state (bright state) to a scattering state (dark state). It is noted that the aforementioned number of scan electrodes (such as scan electrode 3*a*, scan electrode 3*a*-1) electrically connected to the plurality of pixels 51 is only an example but not a limitation. In the writing mode, the scan electrodes 3*b* electrically connected to the plurality of pixels 52 in the non-writing area (that is, the area other than the writing area 71) are applied with a voltage of 0V, for example, and the data electrodes 4*b* are applied with voltage Vd. At this moment, the second voltage difference applied to the plurality of pixels 52 in the non-writing area may be the voltage value V1 or the voltage value Vd. Therefore, the plurality of pixels 52 in the non-writing area may still be kept in a reflective state (bright state), for example.

As shown in FIG. 5(*b*) and FIG. 5(*c*), in the erasing mode, the erasing area 73 may include a plurality of pixels 51, and the plurality of pixels 51 may be, for example, erased sequentially according to the electrically connected scan electrode 3*a* and scan electrode 3*a*-1. For example, a plurality of pixels 51 electrically connected to the scan electrode 3*a* are erased first, and then a plurality of pixels 51 electrically connected to the scan electrode 3*a*-1 are erased, but not limited thereto.

In more detail, as shown in FIG. 5(*b*), in the first stage of the erasing mode, the scan electrode 3*a* electrically connected to a plurality of pixels 51 in the erasing area 73 is applied with, for example, a third application voltage VC, another scan electrode 3*a*-1 electrically connected to a plurality of pixels 51 in the erasing area 73 is applied with, for example, a voltage of 0V, the two data electrodes 4*a* electrically connected to a plurality of pixels 51 in the erasing area 73 are applied with a fourth application voltage VD, the scan electrodes 3*b* not electrically connected to the plurality of pixels 51 in the erasing area 73 are applied with, for example, a voltage of 0V, and the data electrodes 4*b* not electrically connected to the plurality of pixels 51 in the erasing area 73 are applied with, for example, a voltage of −Vd, but not limited thereto. In one embodiment, the third application voltage VC may be, for example, the second setting voltage Vs', and the fourth application voltage VD may be, for example, the voltage −Vd, so that the third voltage difference on the plurality of pixels 51 to be erased may be the voltage value V4, and the plurality of pixels 51 to be erased may be, for example, transited from a scattering state to a transmissive state (that is, to a bright state), that is, the original writing may be erased. In addition, the voltage difference on the other pixels 52 electrically connected to the scan electrode 3*a* may be the voltage value V4, and thus may be still in a bright state, but not limited thereto. In addition, the voltage difference on the plurality of pixels 51 electrically connected to the scan electrode 3*a*-1 is Vd so that the pixels 51 in this area are still in the scattering state, for example, and thus the plurality of pixels 51 electrically connected to the scan electrode 3*a*-1 are still in the dark state. In addition, the second voltage difference on the other pixels 52 electrically connected to the scan electrode 3*a*-1 and the other pixels 52 electrically connected to the scan electrode 3*b* may be the voltage value Vd, so that the pixels are still in a bright state.

As shown in FIG. 5(*c*), in the second stage of the erasing mode, the plurality of pixels 51 electrically connected to the scan electrode 3*a*-1 may be erased; for example, a third application voltage VC may be applied to the scan electrode 3*a*-1, and a fourth application voltage VD is applied to the two data electrodes 4*a* electrically connected to the pixels 51 in the erasing area 73. In one embodiment, the third application voltage VC may be, for example, the second setting voltage Vs', and the fourth application voltage VD may be, for example, the voltage −Vd, so that the third voltage difference on the plurality of pixels 51 to be erased may be the voltage value V4, and the plurality of pixels 51 to be erased may be, for example, transited from a scattering state to a transmissive state (that is, to a bright state), that is, the original writing may be erased. In addition, the voltage difference on the other pixels electrically connected to the scan electrode 3*a* or the scan electrode 3*b* may be the voltage value Vd, so that the pixels are still in a bright state, but not limited thereto.

Accordingly, the third embodiment can be understood.

Figure 6A:
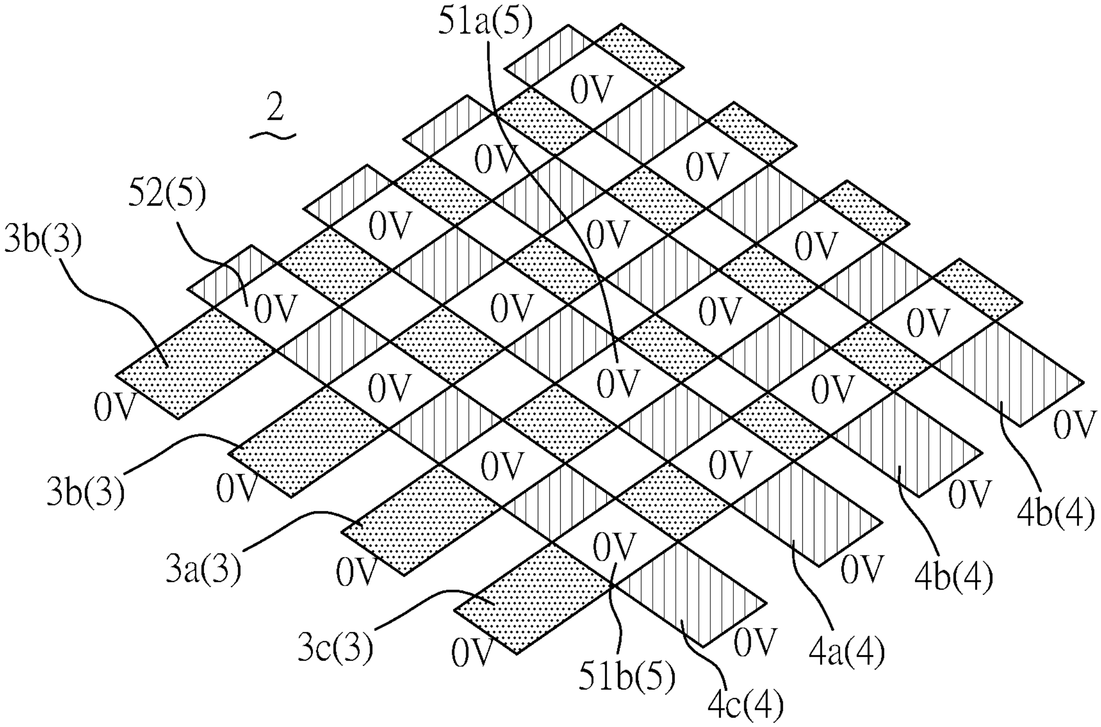
FIGS. 6(*a*) to 6(*c*) are schematic diagrams illustrating a driving process of the electronic device according to the fourth embodiment of the present disclosure.
Figure 6B:
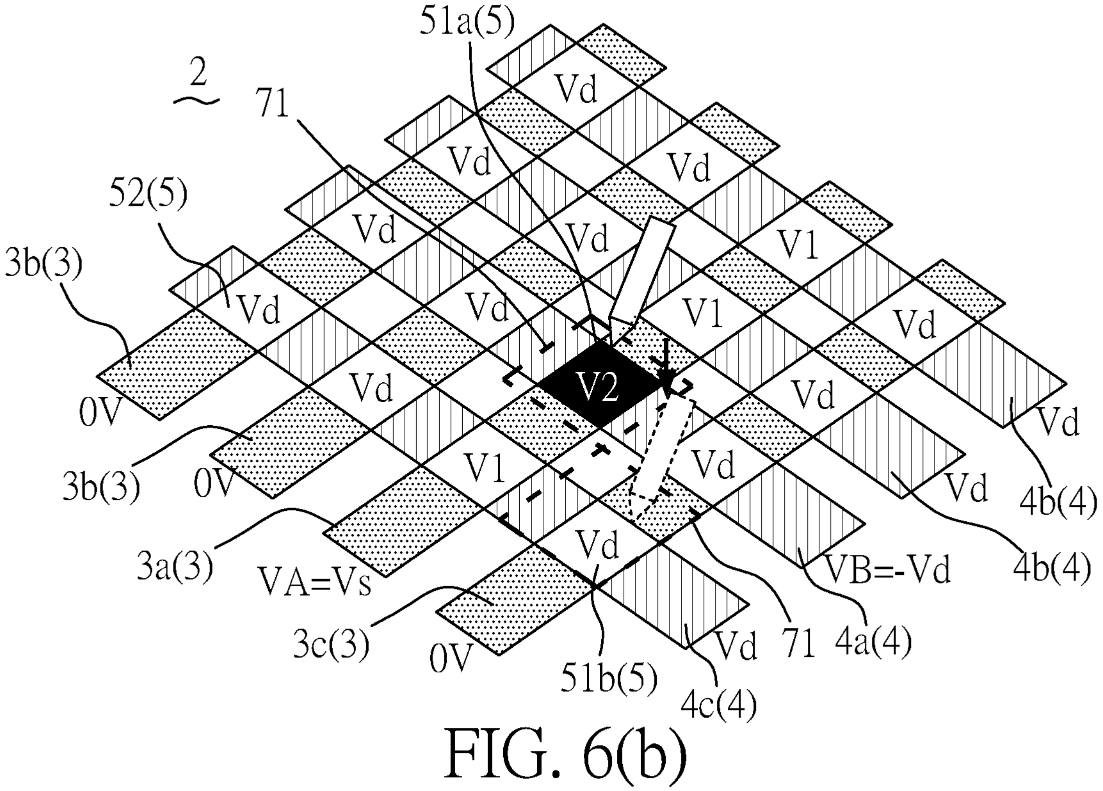
Figure 6C:
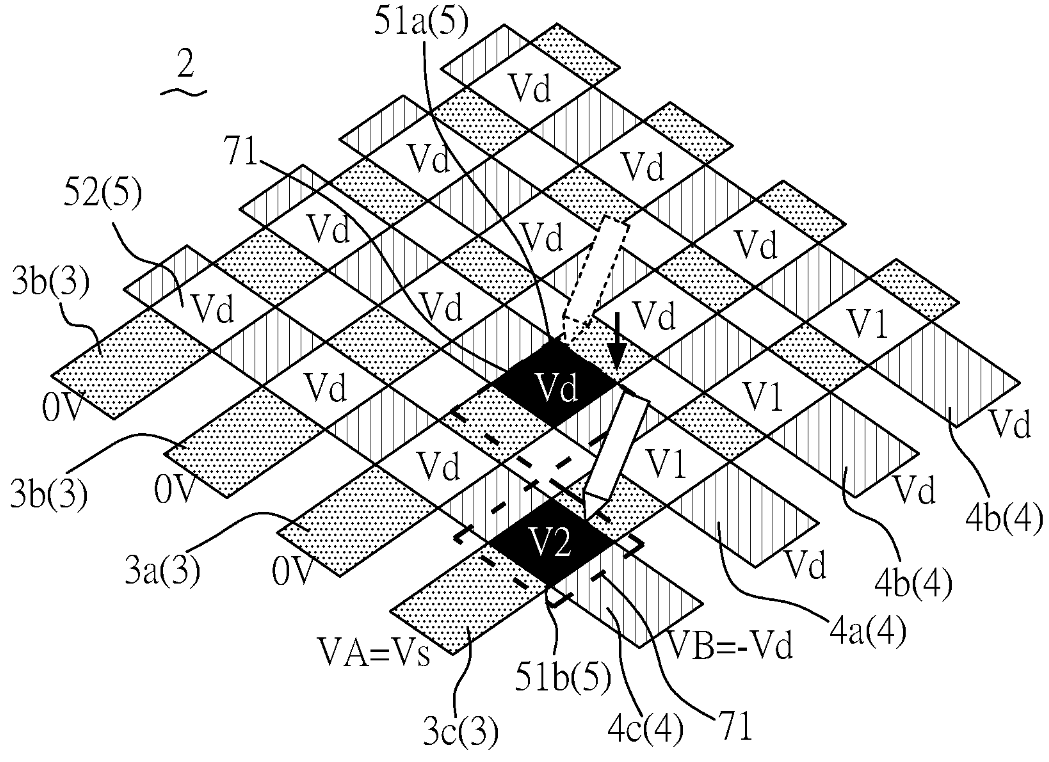

The electronic device 1 of the present disclosure may also be provided with different driving methods. FIG. 6(*a*) to FIG. 6(*c*) are schematic diagrams illustrating the driving process of the electronic device 1 according to the fourth embodiment of the present disclosure. The embodiment of FIG. 6(*a*) to FIG. 6(*c*) is used to illustrate the driving process in continuous writing. It is noted that, in order to make the description clear, the cholesteric liquid crystal layer 6 between the scan electrodes 3 and the data electrodes 4 is not shown in FIG. 6(*a*) to FIG. 6(*c*). FIG. 6(*a*) shows the initial state of the panel 2, and FIG. 6(*b*) and FIG. 6(*c*) show the driving process of the panel 2 in the writing mode for continuous writing.

As shown in FIG. 6(*a*), the initial state of the panel 2 is a bright state (that is, the cholesteric liquid crystal is in a reflective state). At this moment, for example, the scan electrodes 3 and the data electrodes 41 are not applied with an external voltage (that is, the voltage difference applied to the cholesteric liquid crystal is 0). For convenience of description, for example, the first pixel 51*a* to be written is electrically connected to the scan electrode 3*a* and the data electrode 4*a*, and the second pixel 51*b* to be written is electrically connected to the scan electrode 3*c* and the data electrode 4*c*.

As shown in FIG. 6(*b*), in the first stage of the writing mode, the first pixel 51*a* in the writing area 71 is touched or written. At this moment, the scan electrode 3*a* electrically connected to the first pixel 51*a* is, for example, applied with the first application voltage VA, and the first application voltage VA may be, for example, the second setting voltage Vs, but not limited thereto. The data electrode 4*a* electrically connected to the first pixel 51*a* is applied with the second application voltage VB, and the second application voltage VB may be, for example, the voltage −Vd, but not limited thereto. The voltage applied to the scan electrode 3*b* and/or the scan electrode 3*c* not electrically connected to the first pixel 51*a* is, for example, 0V, but not limited thereto. The data electrode 4*b* and the data electrode 4*c* not electrically connected to the first pixel 51*a* are applied with the voltage Vd, but not limited thereto. As a result, the first voltage difference applied to the first pixel 51*a* may be, for example, the voltage value V2, and the first pixel 51*a* may be transited to the scattering state (dark state). The second voltage difference on the other pixels 52 electrically connected to the scan electrode 3*a* may be the voltage value V1, so that the other pixels 52 electrically connected to the scan electrode 3*a* may be, for example, still kept in a reflective state (bright state). The second voltage difference on the other pixels 52 not electrically connected to the scan electrode 3*a* may be, for example, the voltage value Vd, so that the reflective state (bright state) is kept.

As shown in FIG. 6(*c*), in the second stage of the writing mode, the second pixel 51*b* is, for example, touched or written. The first application voltage VA applied to the scan electrode 3*c* electrically connected to the second pixel 51*b* in the writing area 71 may be, for example, the first setting voltage Vs, and the second application voltage VB applied to the data electrode 4*c* electrically connected to the second pixel 51*b* may be, for example, the voltage −Vd. Therefore, the first voltage difference on the second pixel 51*b* may be the voltage value V2, so that the second pixel 51*c* may be, for example, transited to a scattering state (dark state). The second voltage difference on the other pixels 52 electrically connected to the scan electrode 3*c* is the voltage value V1, and thus the other pixels 52 electrically connected to the scan electrode 3*c* are still kept in the reflective state (bright state), for example. In addition, the voltage applied to the scan electrode 3*a* electrically connected to the first pixel 51*a* in the writing area 71 may be adjusted to 0V, for example, and the voltage applied to the data electrode 4*a* electrically connected to the first pixel 51*a* may be adjusted to Vd. Therefore, the voltage difference on the first pixel 51*a* may be the voltage value Vd, which is, for example, insufficient to cause the cholesteric liquid crystal of the first pixel 51*a* to be transited, so that the scattering state (dark state) is still kept. The voltage difference on the other pixels 52 electrically connected to the scan electrode 3*a* is, for example, the voltage value Vd, so that the reflective state (bright state) is still kept. In addition, zero voltage is applied to the scan electrode 3*b*, and voltage Vd is applied to the data electrode 4*b*, so that the pixel 52 electrically connected to the scan electrode 3*b* and the data electrode 4*b* is still kept in a reflective state (bright state).

Accordingly, the fourth embodiment can be understood.

Figure 7A:
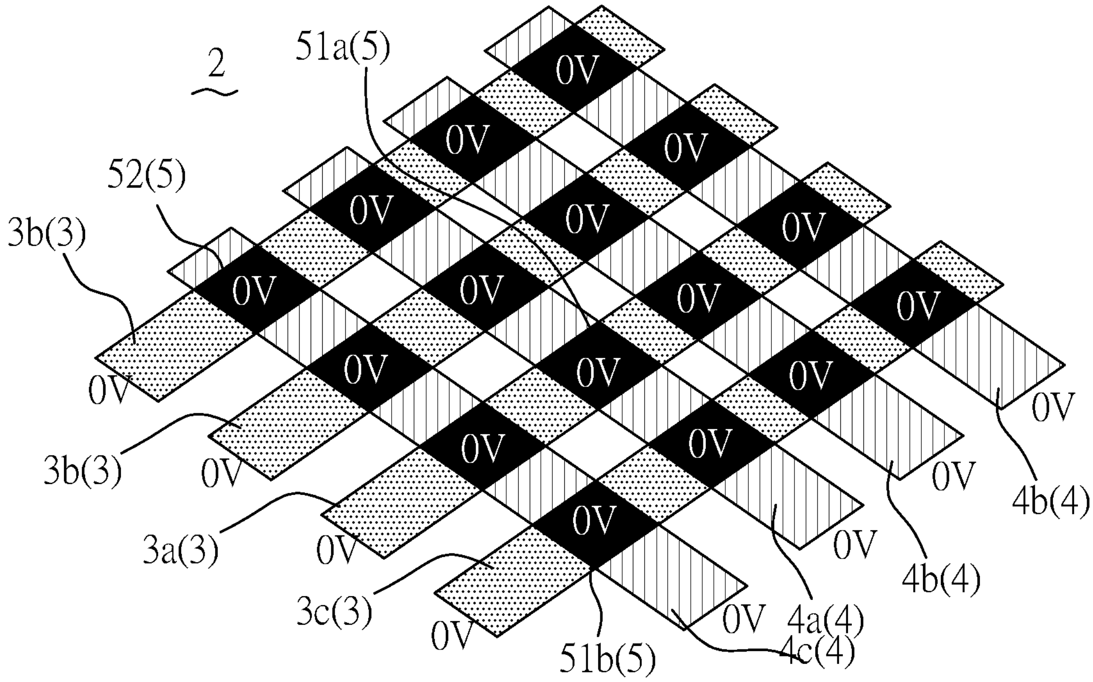
FIGS. 7A(a) to 7A(c) are schematic diagrams illustrating a driving process of the electronic device according to the fifth embodiment of the present disclosure.
Figure 7A:
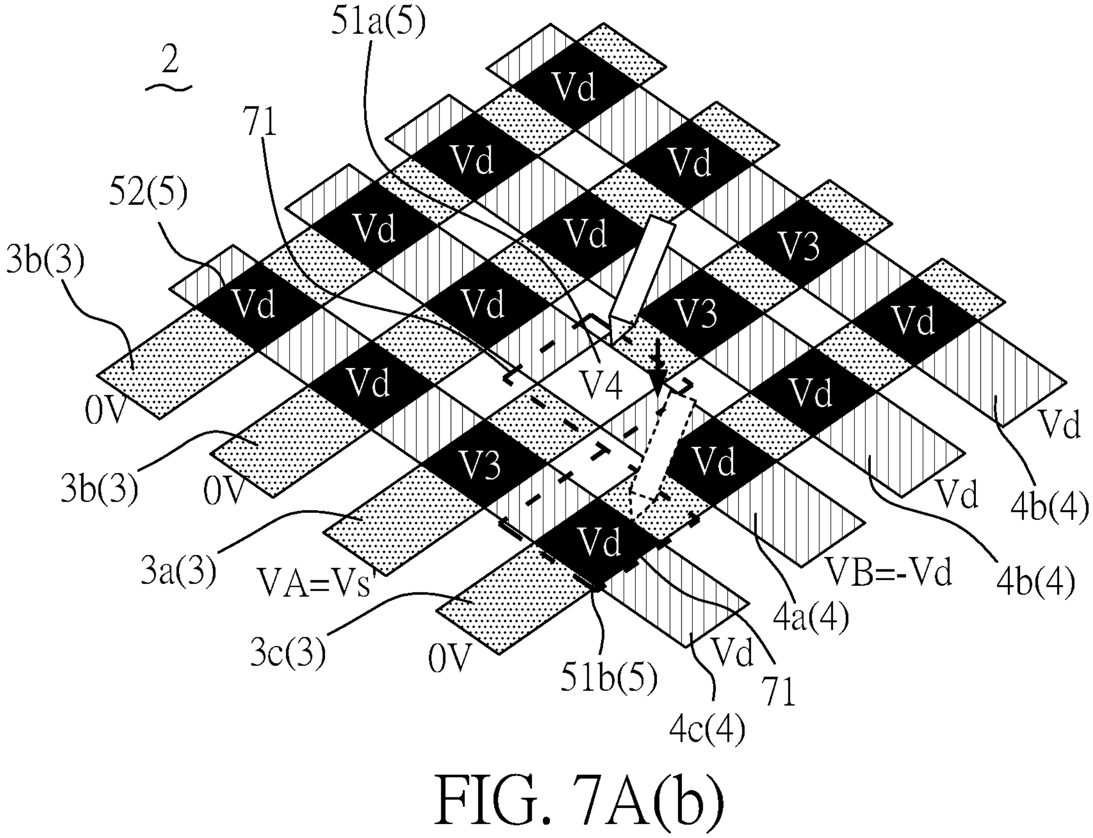
Figure 7A:
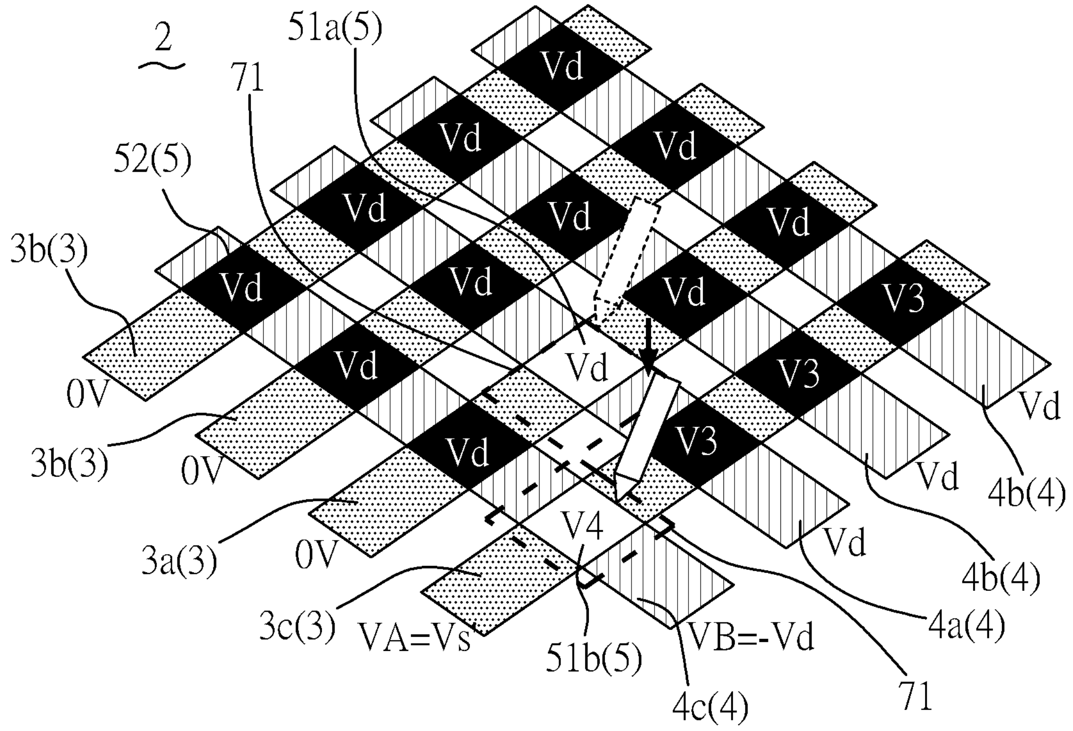

The electronic device 1 of the present disclosure may also be provided with different driving methods. FIG. 7A(a) to FIG. 7A(c) are schematic diagrams illustrating the driving process of the electronic device 1 according to the fifth embodiment of the present disclosure. The embodiment of FIG. 7A(a) to FIG. 7A(c) is used to illustrate another driving process in continuous writing. It is noted that, for clarity of description, the cholesteric liquid crystal layer 6 between the scan electrodes 3 and the data electrodes 4 is not shown in FIG. 7A(a) to FIG. 7A(c). FIG. 7(*a*) shows the initial state of the panel 2, and FIG. 7(*b*) and FIG. 7(*c*) show the driving process of the panel 2 in the writing mode for continuous writing.

Some features of the embodiment of FIG. 7A(a) to 7A(c) may be applicable to the description of the embodiment of FIG. 4(*a*) to FIG. 4(*c*), and thus the following description mainly focuses on the differences. In addition, for convenience of explanation, the first pixel 51*a* to be written is electrically connected to the scan electrode 3*a* and the data electrode 4*a*, and the second pixel 51*b* to be written is electrically connected to the scan electrode 3*c* and the data electrode 4*c*.

As shown in FIG. 7A(a), the initial state of the panel 2 is, for example, a dark state. At this moment, for example, the scan electrodes 3 and the data electrodes 4 are not applied with an external voltage (that is, the voltage difference applied to the cholesteric liquid crystal is 0).

As shown in FIG. 7A(b), in the first stage of the writing mode, the first pixel 51*a* is touched or written. At this moment, the scan electrode 3*a* electrically connected to the first pixel 51*a* is, for example, applied with a first application voltage VA, and the first application voltage VA may be, for example, the second setting voltage Vs'. The data electrode 4*a* electrically connected to the first pixel 51*a* is, for example, applied with the second application voltage VB, and the second application voltage VB may be, for example, the voltage −Vd. The scan electrode 3*b* and the scan electrode 3*c* not electrically connected to the first pixel 51*a* are applied with a voltage of 0V. The data electrode 4*b* and the data electrode 4*c* not electrically connected to the first pixel 51*a* are applied with, for example, the voltage Vd. As a result, the first voltage difference on the first pixel 51*a* may be, for example, the voltage value V4 and, when the fourth voltage V4 is removed, the cholesteric liquid crystal is transited to a reflective state (that is, to a bright state). The second voltage difference on the other pixels 52 electrically connected to the scan electrode 3*a* may be, for example, the voltage value V3, so that the other pixels 52 electrically connected to the scan electrode 3*a* may be, for example, kept in the scattering state (dark state). The second voltage difference on other pixels 52 not electrically connected to the scan electrode 3*a* may be, for example, the voltage value Vd, so that these pixels 52 are kept in the scattering state (dark state).

As shown in FIG. 7A(c), in the second stage of the writing mode, the second pixel 51*b* is touched. At this moment, the first application voltage VA applied to the scan electrode 3*c* electrically connected to the second pixel 51*b* may be, for example, the second setting voltage Vs', the second application voltage VB applied to the data electrode 4*c* electrically connected to the second pixel 51*b* may be, for example, the voltage −Vd, the voltage applied to the scan electrode 3*a* electrically connected to the first pixel 51*a* may be, for example, 0V, the voltage applied to the data electrode 4*a* electrically connected to the first pixel 51*a* may be, for example, the voltage Vd, and the voltage applied to the scan electrode 3*b* and the data electrode 4*b* may, for example, continue the situation of the first stage of the writing mode. As a result, the first voltage difference on the second pixel 51*b* may be the voltage value V4, so that the cholesteric liquid crystal may be, for example, transited to a scattering state (that is, transited to a bright state). In addition, the voltage difference on the first pixel 51*a* may be a voltage value Vd, which is insufficient to cause the cholesteric liquid crystal of the first pixel 51*a* to be transited, so that a reflective state (bright state) is still kept. The second voltage difference on the other pixels 52 electrically connected to the scan electrode 3*c* is the voltage value V3, and thus the other pixels 52 electrically connected to the scan electrode 3*c* are kept in the scattering state (dark state), for example. The second voltage difference applied to the other pixels 52 electrically connected to the scan electrodes 3*a* and 3*b* is, for example, the voltage value Vd, so that the scattering state (dark state) is kept. As a result, the effect of continuous writing may be provided.

Figure 7B:
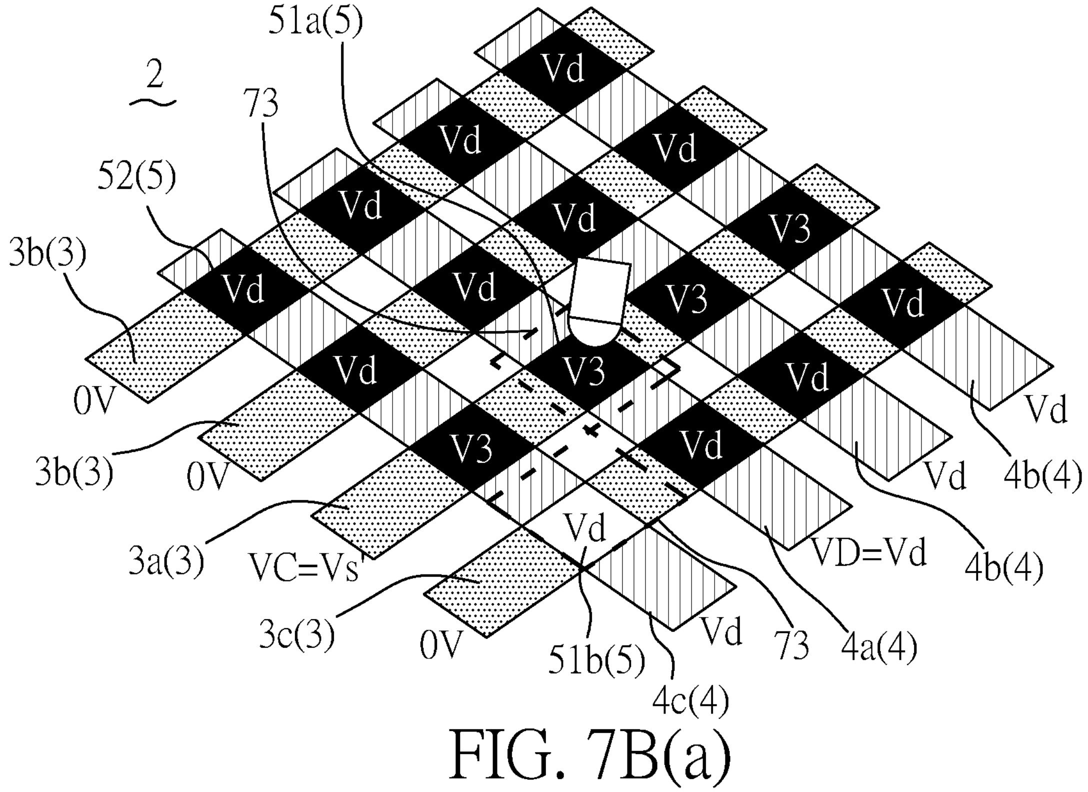
FIGS. 7B(a) to 7B(b) are schematic diagrams illustrating another driving process of the electronic device according to the fifth embodiment of the present disclosure.
Figure 7B:
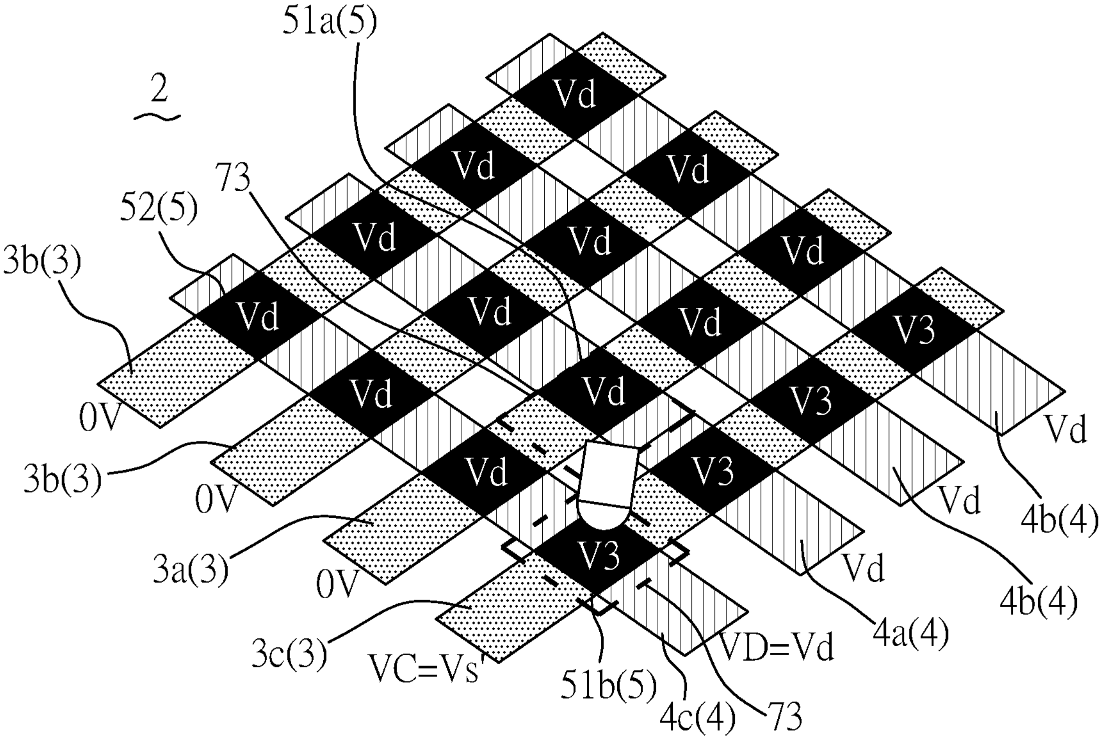

FIG. 7B(a) to FIG. 7B(b) are schematic diagrams illustrating another driving process of the electronic device 1 according to the fifth embodiment of the present disclosure. FIG. 7B(a) to FIG. 7B(b) are used to illustrate the driving process when the written pixels (the first pixel 51*a* and the second pixel 51*b*) of FIG. 7A(c) are erased, wherein FIG. 7B(a) shows the elimination of the voltage difference on the first pixel 51*a*, and FIG. 7B(b) shows the elimination of the voltage difference on the second pixel 51*b*.

As shown in FIG. 7B(a), in the first stage of the erasing mode, the scan electrode 3*a* electrically connected to the first pixel 51*a* is, for example, applied with the second setting voltage Vs', the data electrode 4*a* electrically connected to the first pixel 51*a* is, for example, applied with the voltage Vd, the scan electrode 3*c* electrically connected to the second pixel 51*b* is, for example, applied with a voltage of 0V, and the data electrode 3*c* electrically connected to the second pixel 51*b* is applied with the voltage Vd. The scan electrode 3*b* is, for example, applied with a voltage of 0V, and the data electrode 4 *b* is, for example, applied with a voltage of Vd. As a result, the third voltage difference on the first pixel 51*a* may be a voltage value V3, so that the first pixel 51*a* may be transited to the scattering state (dark state). The voltage difference on the second pixel 51*b* may be the voltage value Vd, so that the second pixel 51*b* is still kept in the reflective state (bright state). The voltage difference applied to the other pixels 52 is, for example, voltage value Vd or voltage value V3, so that the scattering state (dark state) is kept.

As shown in FIG. 7B(b), in the second stage of the erasing mode, the scan electrode 3*c* electrically connected to the second pixel 51*b* is, for example, applied with the second setting voltage Vs', the data electrode 41*c* electrically connected to the second pixel 51*b* is, for example, applied with the voltage Vd, the scan electrode 3*a* electrically connected to the first pixel 51*a* is, for example, applied with a voltage of 0V, and the data electrode 3*a* electrically connected to the first pixel 51*a* is applied with the voltage Vd. The scan electrode 3*b* is applied with a voltage of 0V, and the data electrode 4*b* is applied with the voltage Vd, for example. As a result, the third voltage difference on the second pixel 51*b* may be the voltage value V3, so that the cholesteric liquid crystal of the second pixel 51*b* may be, for example, transited to a scattering state (dark state). The voltage difference on the first pixel 51*a* may be the voltage value Vd, so that the second pixel 51*b* may be kept in the scattering state (dark state). As a result, the effect of continuously erasing the written pixels 51 may be provided.

Accordingly, the fifth embodiment can be understood.

Figure 8A:
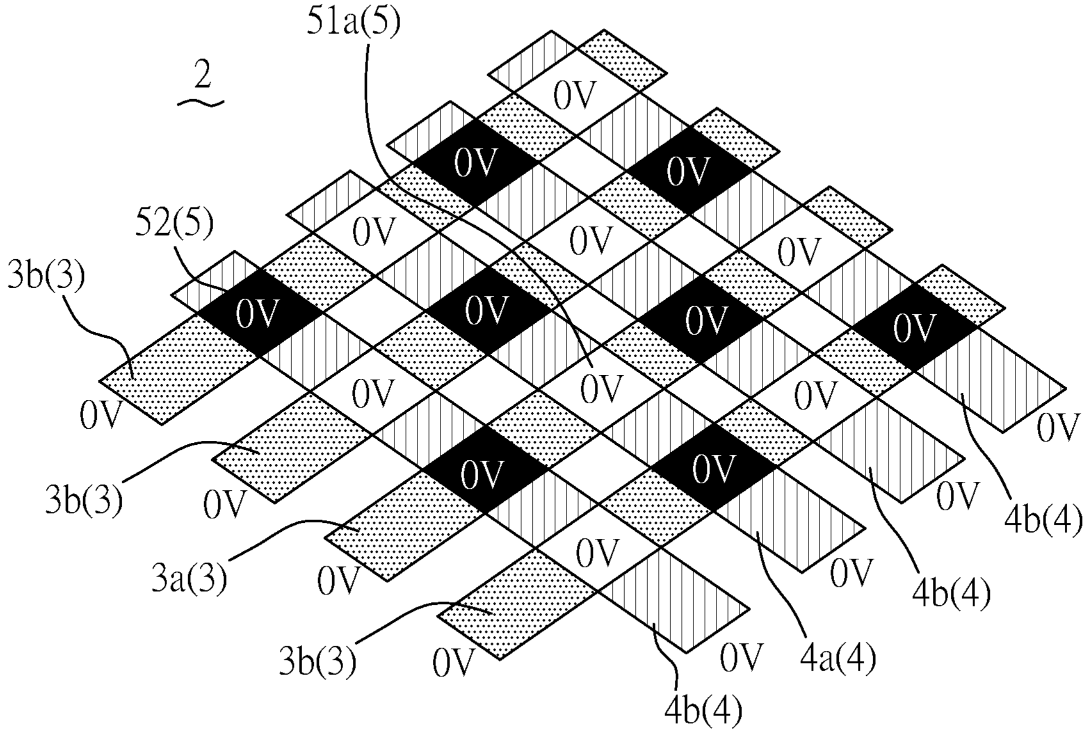
FIGS. 8(*a*) to 8(*c*) are schematic diagrams illustrating a driving process of the electronic device according to the sixth embodiment of the present disclosure.
Figure 8B:
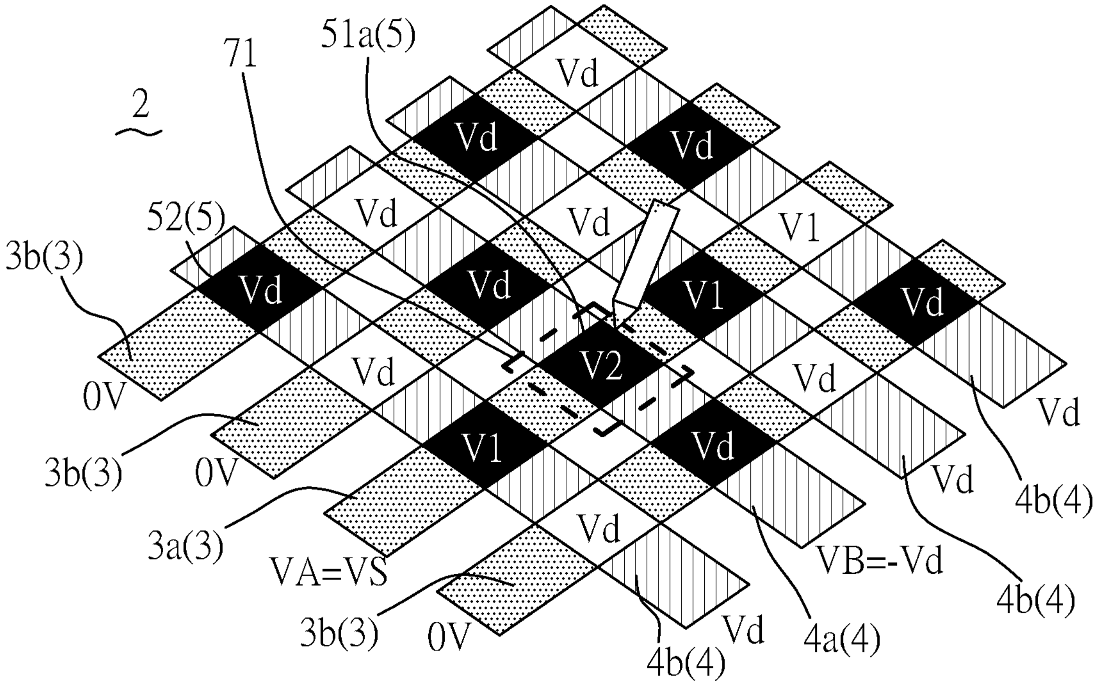
Figure 8C:
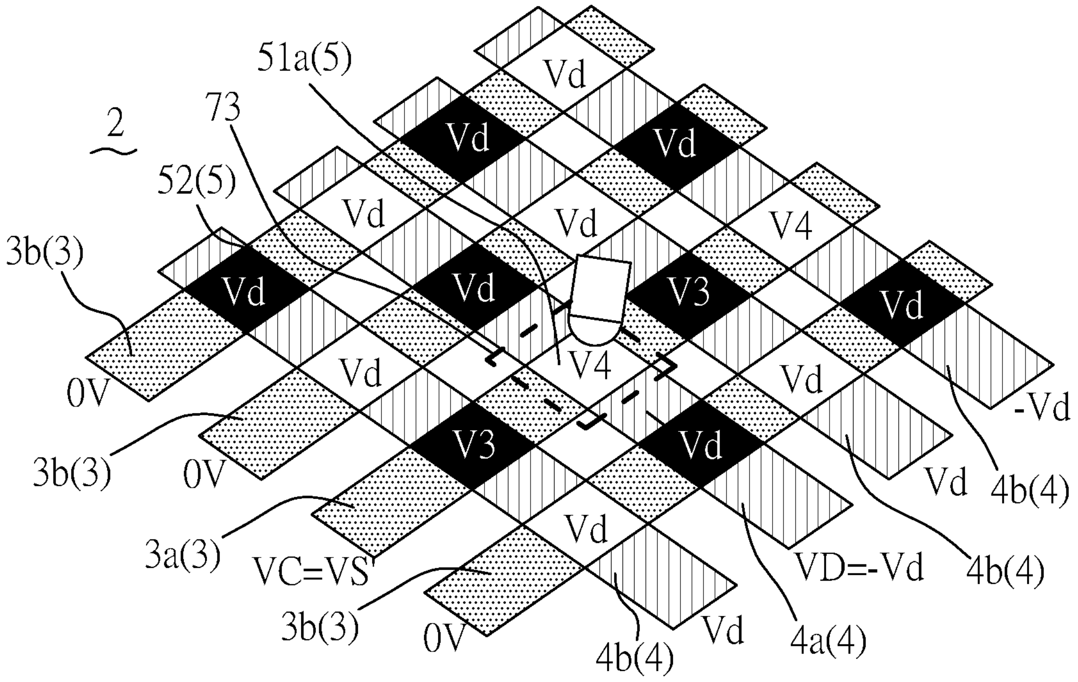

The electronic device 1 of the present disclosure may also be provided with different driving methods. FIG. 8(*a*) to FIG. 8(*c*) are schematic diagrams illustrating the driving process of the electronic device 1 according to the sixth embodiment of the present disclosure. The embodiment of FIG. 8(*a*) to FIG. 8(*c*) is used to illustrate that the initial state of the panel 2 is such that some pixels are in a bright state and some pixels are in a dark state. It is noted that, for clarity of description, the cholesteric liquid crystal layer 6 between the scan electrodes 3 and the data electrodes 4 is not shown in FIG. 8(*a*) to FIG. 8(*c*). FIG. 8(*a*) shows the initial state of the panel 2, FIG. 8(*b*) shows the driving process of the panel 2 for writing in the writing mode, and FIG. 8(*c*) shows the driving process of the panel 2 for erasing in the erasing mode.

As shown in FIG. 8(*a*), some pixels of the panel are in a bright state and some pixels are in a dark state. For example, the pixels in the bright state and the dark state are intersected with each other to form a checkerboard-like pattern, but not limited thereto. At this moment, for example, no external voltage is applied to all scan electrodes 3 and data electrodes 4; for example, the voltage applied to both scan electrodes 3 and data electrodes 4 is 0V.

As shown in FIG. 8(*b*), in the writing mode, the pixel 51*a* of the writing area 71 (for example, corresponding to the pixel that is initially bright) is touched or written. The scan electrode 3*a* electrically connected to the pixel 51*a* is applied with the first application voltage VA, which is, for example, the first setting voltage Vs, and the data electrode 4*a* electrically connected to the pixel 51*a* is applied with the second application voltage VB is the voltage −Vd, whereby the voltage difference on the first pixel 51*a* may be a voltage value V2, and thus the pixel 51*a* may be, for example, transited from a reflective state (bright state) to a scattering state (dark state). In addition, the scan electrode 3*b* not electrically connected to the pixel 51*a* is, for example, applied with a voltage of 0V, but not limited thereto. The data electrode 4*b* not electrically connected to the pixel 51*a* is, for example, applied with the voltage Vd. As a result, the voltage difference on the other pixels 52 (pixels other than the pixel 51*a*) electrically connected to the scan electrode 3*a* may be, for example, the voltage value V1, which is insufficient for the cholesteric liquid crystals of the other pixels 52 to make state transition, so that the state is still kept the same as shown in FIG. 8(*a*), but not limited thereto. In addition, the voltage difference on the other pixels 52 electrically connected to the scan electrode 3*b* may be, for example, Vd, so that the same state as shown in FIG. 8(*a*) is kept.

As shown in FIG. 8(*c*), in the erasing mode, the third application voltage VC applied to the scan electrode 3*a* electrically connected to the pixel 51*a* in the erasing area 73 is, for example, the second setting voltage Vs', and the fourth application voltage VD applied to the data electrode 4*a* electrically connected to the pixel 51*a* is voltage −Vd, whereby the voltage difference on the pixel 51*a* may be, for example, the voltage value V4. Therefore, when the voltage difference (voltage value V4) applied to the pixel 51*a* is removed, the cholesteric liquid crystal may be, for example, transited from a scattering state (dark state) to a reflective state (bright state). In addition, the voltage applied to the scan electrode 3*b* not electrically connected to the pixel 51*a* is, for example, 0V. The data electrode 4*b* not electrically connected to the pixel 51*a* is selectively applied with, for example, the voltage Vd or the voltage −Vd. For example, the data electrode 4*b* adjacent to the data electrode 4*a* is applied with the voltage Vd, and the data electrode 4*b* not adjacent to the data electrode 4*a* is applied with the voltage −Vd, while it is not limited thereto. The method of applying the voltages may be adjusted according to the conditions of the initial screen of the panel. As a result, the voltage difference on the other pixels 52 connected to the scan electrode 3*a* and adjacent to the pixel 51*a* may be the voltage value V3, so that the dark state is still kept, and the voltage difference on the other pixels 52 connected to the scan electrode 3*a* and not adjacent to the pixel 51*a* may be the voltage value V4, so that a bright state is present. In addition, the voltage difference on the other pixels 52 electrically connected to the scan electrode 3*b* is Vd, so that the same state as in FIG. 8(*b*) is still kept.

Accordingly, the sixth embodiment can be understood.

Figure 9A:
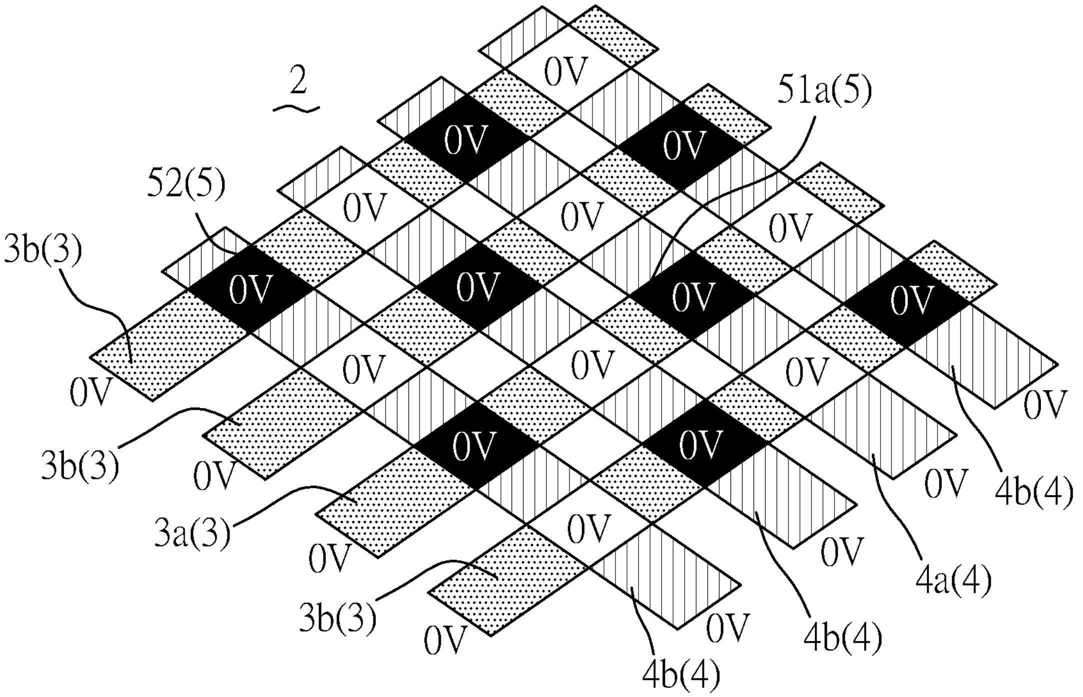
FIGS. 9(*a*) to 9(*c*) are schematic diagrams illustrating a driving process of the electronic device according to the seventh embodiment of the present disclosure.
Figure 9B:
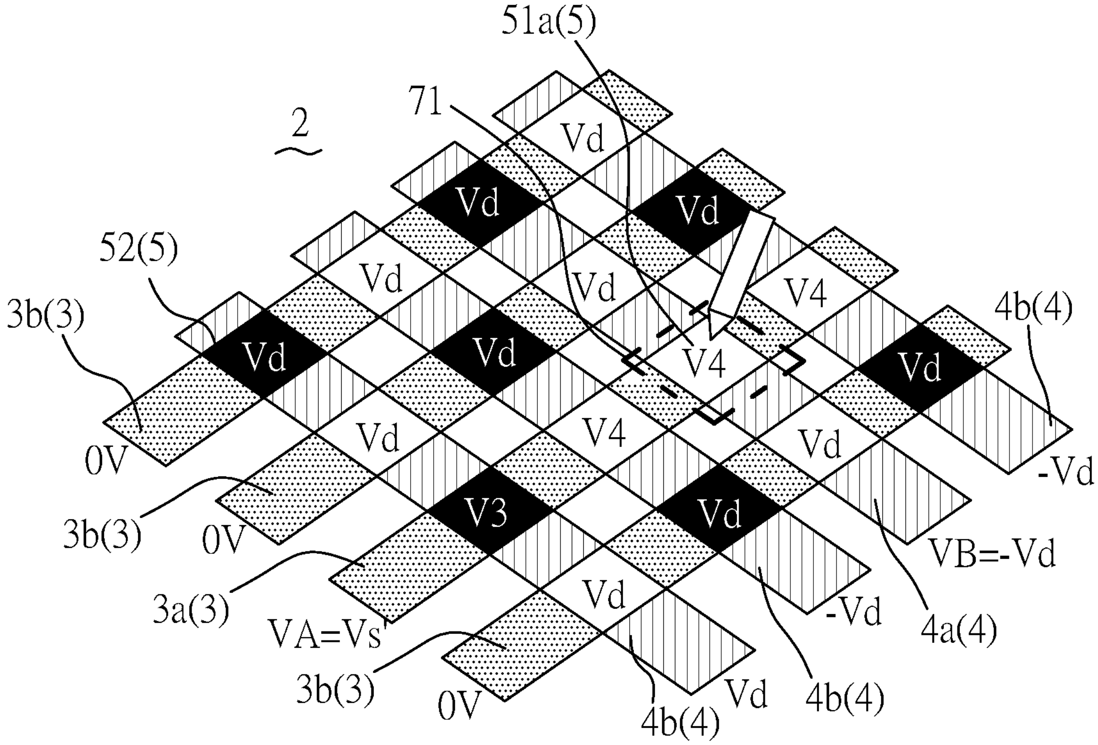
Figure 9C:
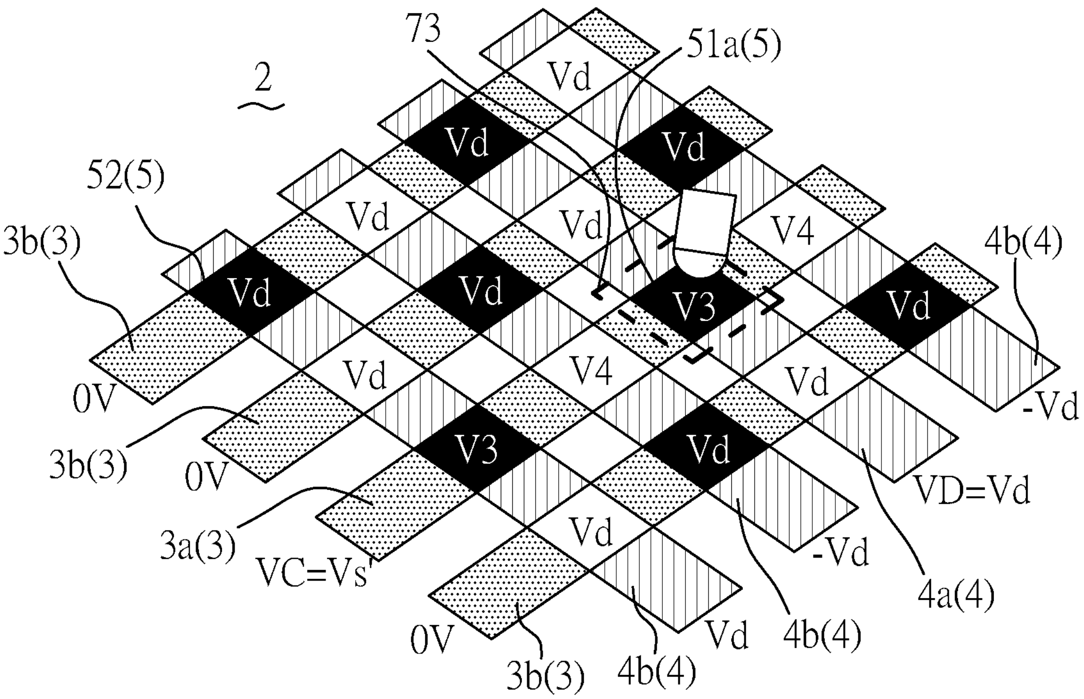

The electronic device 1 of the present disclosure may also be provided with different driving methods. FIG. 9(*a*) to FIG. 9(*c*) are schematic diagrams illustrating the driving process of the electronic device 1 according to the seventh embodiment of the present disclosure. The embodiment of FIG. 9(*a*) to FIG. 9(*c*) is used to illustrate that the initial state of the panel 2 is such that some pixels are in a bright state and some pixels are in a dark state. It is noted that, in order to make the description clear, the cholesteric liquid crystal layer 6 between the scan electrodes 3 and the data electrodes 4 is not shown in FIG. 9(*a*) to FIG. 9(*c*). FIG. 9(*a*) shows the initial state of the panel 2, FIG. 9(*b*) shows the driving process of the panel 2 in the writing mode, and FIG. 9(*c*) shows the driving process of the panel 2 in the erasing mode.

As shown in FIG. 9(*a*), the initial state of panel 2 is such that some pixels are in a bright state and some pixels are in a dark state. For example, the pixels in the bright state and the dark state are intersected with each other to form a checkerboard-like pattern, but it not limited thereto. At this moment, for example, no external voltage is applied to the scan electrodes 3 and the data electrodes 4. For example, the voltage applied to both the scan electrodes 3 and the data electrodes 4 is 0V.

As shown in FIG. 9(*b*), in the writing mode, the pixel 51*a* in the writing area 71 (for example, corresponding to the pixel in the dark state initially) is touched or written. At this moment, the first application voltage VA applied to the scan electrode 3*a* electrically connected to the pixel 51*a* is, for example, the second setting voltage Vs', and the second application voltage VB applied to the data electrode 41*a* electrically connected to the pixel 51*a* is, for example, the voltage −Vd, whereby the voltage difference applied to the pixel 51*a* in the writing area 71 may be, for example, a voltage value V4, so that the pixel 51*a* may be, for example, transited from a scattering state (dark state) to a reflective state (bright state). In addition, the voltage applied to the scan electrode 3*b* not electrically connected to the pixel 51*a* is, for example, 0V. The data electrode 4*b* not electrically connected to the pixel 51*a* is selectively applied with the voltage Vd or the voltage −Vd. For example, the data electrode 4*b* adjacent to the data electrode 4*a* is applied with the voltage −Vd, and the data electrode 4*b* not adjacent to the data electrode 4*a* is applied with the voltage Vd. As a result, the voltage difference on the other pixels 52*a* electrically connected to the scan electrode 3*a* and adjacent to the pixel 51*a* may be the voltage value V4. When the voltage difference (voltage value V4) is subsequently removed, it may be transited to a reflective state (bright state), that is, the same state as in FIG. 9(*a*) is kept, and the voltage difference on the pixel 52 electrically connected to the scan electrode 3*a* and not adjacent to the pixel 51*a* is the voltage value V3, so that a scattering state (dark state) is present, that is, the same state as in FIG. 9(*a*) is kept. In addition, the voltage difference on the other pixels 52 electrically connected to the scan electrode 3*b* may be the voltage value Vd, so that the same state as in FIG. 9(*a*) is kept.

As shown in FIG. 9(*c*), in the erasing mode, the scan electrode 3*a* electrically connected to the pixel 51*a* in the erasing area 73 is applied with the second setting voltage Vs', and the data electrode 4*a* electrically connected to the pixel 51*a* is, for example, applied with the voltage Vd, whereby the voltage difference on the pixel 51*a* may be the voltage value V3, so that the pixel 51*a* may be, for example, transited from a reflective state (bright state) to a scattering state (dark state). In addition, the voltage applied to the scan electrode 3*b* not electrically connected to the pixel 51*a* is, for example, 0V. The data electrode 4*b* not electrically connected to the pixel 51*a* is selectively applied with the voltage Vd or the voltage −Vd. For example, the data electrode 4*b* adjacent to the data electrode 4*a* is applied with the voltage −Vd, and the data voltage 4*b* not adjacent to the data electrode 4*a* is applied with the voltage Vd. As a result, the voltage difference on the other pixels 52 electrically connected to the scan electrode 3*a* and not adjacent to the pixel 51*a* may be V3, so that the dark state is still kept, that is, the same state as in FIG. 9(*b*) is kept. The voltage difference on the other pixels 52 electrically connected to the scan electrode 3*a* and adjacent to the pixel 51*a* may be the voltage value V4. When this voltage difference (V4) is subsequently removed, the bright state may be present, that is, the same state as in FIG. 9(*b*) is kept. In addition, the voltage difference on the other pixels 52 electrically connected to the scan electrode 3*b* is the voltage value Vd, so that the same state as in FIG. 9(*b*) is still kept.

Accordingly, the seventh embodiment can be understood.

Figure 10:
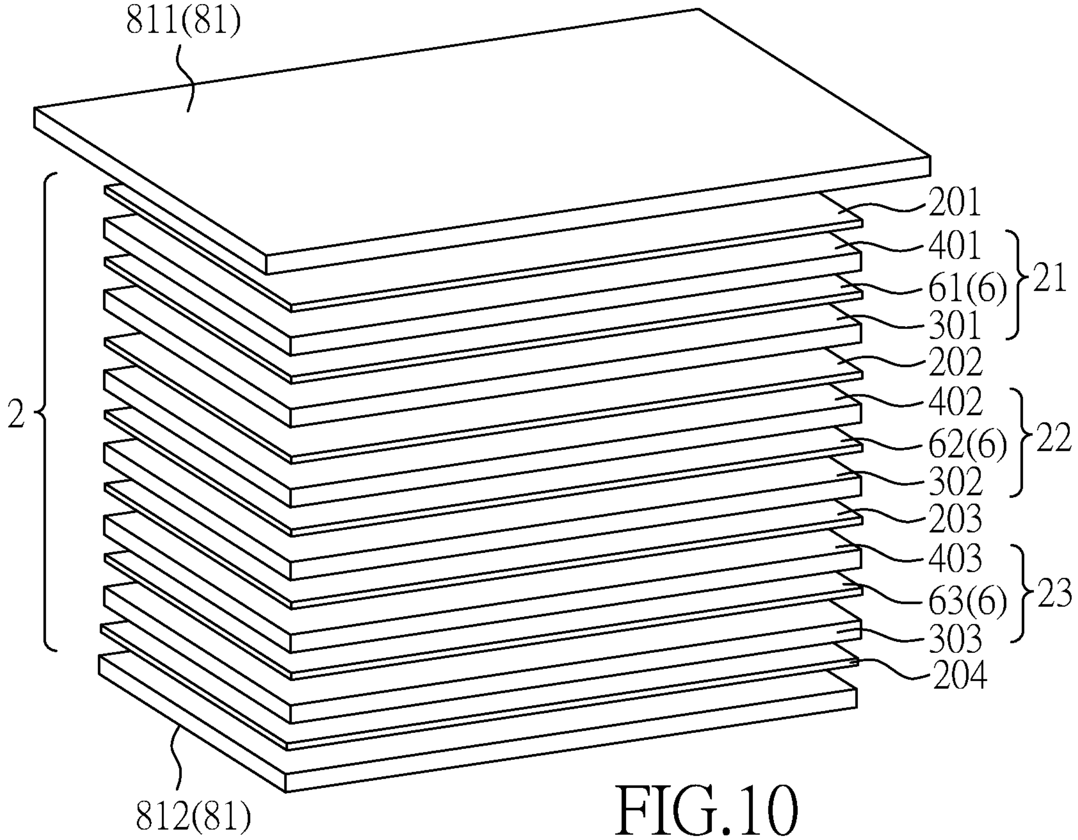
FIG. 10 is a schematic diagram illustrating the detailed structure of a panel according to an embodiment of the present disclosure.

The structure of the panel 2 of the present disclosure may be implemented in different ways. FIG. 10 is a schematic diagram of the detailed structure of the panel 2 according to an embodiment of the present disclosure, and please refer to FIG. 1 to FIG. 9 at the same time.

As shown in FIG. 10, the panel 2 may include a first sub-panel 21, a second sub-panel 22 and a third sub-panel 23. The first sub-panel 21, the second sub-panel 22 and the third sub-panel 23 are cholesteric liquid crystal panels that reflect different colors, respectively, but not limited thereto. In other words, the first sub-panel 21, the second sub-panel 22 and the third sub-panel 23 include cholesteric liquid crystals that reflect different colors, respectively.

The second sub-panel 22 is, for example, disposed between the third sub-panel 23 and the first sub-panel 21. The first detection element 811 is, for example, adjacent to the first sub-panel 21. The second detection element 812 is, for example, adjacent to the third sub-panel 23. In some embodiments, the second detection element 812, the third sub-panel 23, the second sub-panel 22, the first sub-panel 21, and the first detection element 811 are, for example, stacked in sequence from bottom to top, and other components may be optionally inserted or deleted.

In some embodiments, the detection element is adjacent to the panel 2. The detection element includes a first detection element 811 and/or a second detection element 812. The first detection element 811 includes, for example, a touch structure 811, and the second detection component 812 includes, for example, a signal receiving structure 812. The panel 2 may be disposed between the first detection element 811 and the second detection element 812, but not limited thereto.

In some embodiments, an attaching member 201 may be disposed between the first sub-panel 21 and the first detection element 811. In some embodiments, an attaching member 202 may be disposed between the first sub-panel 21 and the second sub-panel 22. In some embodiments, an attaching member 302 may be disposed between the second sub-panel 22 and the third sub-panel 23. In some embodiments, the attaching member 204 may be disposed between the third sub-panel 23 and the second detection element 812. The aforementioned attaching members (such as attaching members 201, 202, 203, 204) may include, for example, transparent materials, such as optical clear adhesive (OCA), optical clear resin (OCR) or other suitable materials or a combination thereof, but not limited thereto.

In some embodiments, the first sub-panel 21 may include a first conductive layer 301 (for example, forming one type of electrodes among the aforementioned scan electrodes and data electrodes), a first cholesteric liquid crystal layer 61 and a second conductive layer 401 (for example, forming the other type of electrodes among the aforementioned scan electrodes and data electrodes). In one embodiment, the first sub-panel 21 may include two substrates (not shown), and the first conductive layer 301 and the second conductive layer 401 are, for example, disposed between the two substrates. The material of the conductive layer (the first conductive layer 301 or the second conductive layer 401) may include, for example, a transparent conductive material, but not limited thereto. For example, it includes indium tin oxide (ITO), tin oxide (SnO), zinc oxide (ZnO), indium zinc oxide (IZO), indium gallium zinc oxide (IGZO), indium tin zinc oxide (ITZO), antimony tin oxide (ATO), antimony zinc oxide (AZO), other suitable transparent conductive materials or a combination thereof, but not limited thereto. In one embodiment, the first cholesteric liquid crystal layer 61 may be used to reflect blue light, but not limited thereto.

Similarly, the second sub-panel 22 may include a third conductive layer 302 (for example, forming one type of electrodes among the aforementioned scan electrodes and data electrodes), a second cholesteric liquid crystal layer 62 and a fourth conductive layer 402 (for example, forming the other type of electrodes among the aforementioned scan electrodes and data electrodes). In one embodiment, the second sub-panel 22 may include two substrates (not shown), and the third conductive layer 302 and the fourth conductive layer 402 are, for example, disposed between the two substrates. The materials of the third conductive layer 302 or the fourth conductive layer 402 may be applied to the description of the first conductive layer 301 or the second conductive layer 401, and thus a detailed description is deemed unnecessary. In one embodiment, the second cholesteric liquid crystal layer 62 may be used to reflect green light, but not limited thereto.

Similarly, the third sub-panel 23 may include a fifth conductive layer 303 (for example, forming one type of electrodes among the aforementioned scan electrodes and data electrodes), a third cholesteric liquid crystal layer 63 and a sixth conductive layer 403 (for example, forming the other type of electrodes among the aforementioned scan electrodes and data electrodes). In one embodiment, the third sub-panel 23 may include two substrates (not shown), and the fifth conductive layer 303 and the sixth conductive layer 403 are, for example, disposed between the two substrates. In one embodiment, the description of the first conductive layer 301 or the second conductive layer 401 may be applied to the fifth conductive layer 303 or the sixth conductive layer 403, and thus a detailed description is deemed unnecessary. In one embodiment, the third cholesteric liquid crystal layer 63 may be used to reflect red light, but not limited thereto.

In one embodiment, the first detection element 811 may be, for example, a touch structure, including a touch panel, for detecting touches by fingers or other objects, but not limited thereto. In one embodiment, the first detection element 811 may include, for example, a capacitive touch element or a resistive touch element, but not limited thereto. In one embodiment, the second detection component 812 may include a signal receiving structure. In one embodiment, the signal receiving structure may include, for example, an electromagnetic pen receiver, such as an electromagnetic pen sensor, which may detect the touch of an object through electromagnetic induction, but not limited thereto.

In one embodiment (not shown), the electronic device 1 may also be provided with a single detection component 81, such as one of the first detection component 811 or the second detection component 812, while it is not limited thereto. In one embodiment, the detection element 81 may also be integrated into the panel 2 using embedded (on-cell, in-cell) touch technology. For example, the detection element 81 may be integrated into the first sub-panel 2, while it is not limited thereto.

In one embodiment, for the corresponding pixel positions, the first sub-panel 21, the second sub-panel 22 and the third sub-panel 23 may be driven respectively to present a bright state or a dark state thereby forming different colors, respectively, but not limited thereto.

In one embodiment, the electronic device 1 of the present disclosure may be applied to products that require handwriting (writing or erasing), such as e-books or electronic paper, while it is not limited thereto.

Accordingly, the structure of the display panel 2 can be understood.

In one embodiment of the present disclosure, evidence may be provided by at least performing a comparison on a product through mechanical observation, such as the presence or absence of components or the operational relationship between components, so as to determine whether the product falls within the patent protection scope of the present disclosure, but not limited thereto.

Accordingly, the electronic device of the present disclosure may provide different voltages to different pixels on the panel to implement the writing function, thereby achieving local control effects and reducing energy consumption. Alternatively, the electronic device of the present disclosure may provide a local erasing function.

The details or features of various embodiments of the present disclosure may be mixed and matched as long as they do not violate or conflict the spirit of the present disclosure.

The aforementioned specific embodiments should be construed as merely illustrative, and not limiting the rest of the present disclosure in any way.

The invention claimed is:

1. An electronic device, comprising:

a panel including:

a plurality of scan electrodes;

a plurality of data electrodes intersected with the plurality of scan electrodes to define a plurality of pixels; and a cholesteric liquid crystal layer disposed between the plurality of scan electrodes and the plurality of data electrodes, wherein, in a writing mode, a user input touches at least one pixel disposed in a writing area, and a first voltage difference is applied to the at least one pixel disposed in the writing area in response to the user input, and a second voltage difference is applied to at least a portion of the other pixels disposed in a non-writing area in response to the user input, and in an erasing mode, the user input touches at least one pixel disposed in an erasing area, and a third voltage difference is applied to the at least one pixel disposed in the erasing area in response to the user input, where the first voltage difference is different from the second voltage difference, and the first voltage difference is different from the third voltage difference, wherein in the writing mode, the panel displays a writing according to the user input, and in the erasing mode, the panel erases at least part of the writing according to the user input;

wherein the first voltage difference is a second voltage value, the second voltage difference is a first voltage value or a data voltage, and the third voltage difference is a fourth voltage value, where Vd<V1<V2<V4, Vd stands for the data voltage, V1 stands for the first voltage, V2 stands for the second voltage, and V4 stands for the fourth voltage.

2. The electronic device as claimed in claim 1, wherein in the writing mode, a first application voltage is applied to a scan electrode electrically connected to the at least one pixel disposed in the writing area, a second application voltage is applied to a data electrode electrically connected to the at least one pixel disposed in the writing area, and neither the first application voltage nor the second application voltage is 0V.

3. The electronic device as claimed in claim 2, wherein the first application voltage and the second application voltage satisfy a relationship: |VA|>|VB|, where VA is the first application voltage, and VB is the second application voltage.

4. The electronic device as claimed in claim 1, wherein in the writing mode, a first application voltage is applied to a scan electrode electrically connected to the at least one pixel disposed in the writing area, and a voltage of 0V is applied to a data electrode electrically connected to the at least one pixel disposed in the writing area.

5. The electronic device as claimed in claim 1, wherein a first application voltage is applied to the scan electrode electrically connected to the at least one pixel disposed in the writing area, a second application voltage is applied to the data electrode electrically connected to the at least one pixel disposed in the writing area, and the first application voltage and the second application voltage satisfy a relationship: |VA|=|VB|, where VA is the first application voltage, and VB is the second application voltage.

6. The electronic device as claimed in claim 1, wherein in the erasing mode, a third application voltage is applied to a scan electrode electrically connected to the at least one pixel disposed in the erasing area, a fourth application voltage is applied to a data electrode electrically connected to the at least one pixel disposed in the erasing area, and neither the third application voltage nor the fourth application voltage is 0V.

7. The electronic device as claimed in claim 6, wherein the third application voltage and the fourth application voltage satisfy a relationship: |VC|>|VD|, where VC is the third application voltage, and VD is the fourth application voltage.

8. The electronic device as claimed in claim 1, further comprising:

a detection element adjacent to the panel;

a driving circuit for driving the plurality of pixels; and a controller electrically connected between the detection element and the driving circuit, wherein, in the writing mode, the detection element detects a writing position and provides the writing position to the controller, the controller sends driving information to the driving circuit according to the writing position, and the driving circuit provides the first voltage difference to the at least one pixel in the writing area according to the driving information.

9. The electronic device as claimed in claim 8, wherein, in the erasing mode, the detection element detects an erasing position and provides the erasing position to the controller, the controller sends another driving information to the driving circuit according to the erasing position, and the driving circuit provides the third voltage difference to the at least one pixel in the erasing area according to the another driving information.

10. The electronic device as claimed in claim 1, further comprising a detection element adjacent to the panel, wherein the detection element includes a touch structure and a signal receiving structure.

11. The electronic device as claimed in claim 1, wherein the panel includes a plurality of sub-panels, and each of the plurality of sub-panels includes a cholesteric liquid crystal layer that reflects a different color.

12. The electronic device as claimed in claim 1, wherein, in the writing mode, a voltage of 0V is applied to the other scan electrodes, and the data voltage is applied to the other data electrodes.

13. The electronic device as claimed in claim 1, wherein the first application voltage is a first setting voltage, the second application voltage is a negative value of the data voltage, and the first setting voltage is between the first voltage value and the second voltage value.

14. The electronic device as claimed in claim 13, wherein the first voltage difference is a difference between the first application voltage and the second application voltage.

15. The electronic device of claim 13, wherein the second voltage difference is a difference between the first setting voltage and the data voltage.

16. The electronic device as claimed in claim 1, wherein the third application voltage is a second setting voltage, the fourth application voltage is a negative value of the data voltage, and the second setting voltage is between a third voltage value and the fourth voltage value.

17. The electronic device as claimed in claim 16, wherein the third voltage difference is a difference between the second setting voltage and the fourth application.

18. The electronic device as claimed in claim 16, wherein, in the erasing mode, a voltage of 0V is applied to the other scan electrodes, and the negative value of the data voltage is applied to the other data electrodes.

19. The electronic device as claimed in claim 18, wherein the voltage difference on the other pixels is a difference between the second setting voltage and the negative value of the data voltage.

* * * * *